United States Patent [19]

Fischer et al.

[11] Patent Number: 5,077,732
[45] Date of Patent: Dec. 31, 1991

[54] LAN WITH DYNAMICALLY SELECTABLE MULTIPLE OPERATIONAL CAPABILITIES

[75] Inventors: Michael A. Fischer; William M. Cox, both of San Antonio, Tex.

[73] Assignee: Datapoint Corporation, San Antonio, Tex.

[21] Appl. No.: 559,391

[22] Filed: Jul. 24, 1990

Related U.S. Application Data

[63] Continuation of Ser. No. 270,804, Nov. 14, 1988, abandoned.

[51] Int. Cl.[5] .............................. H04J 3/02; H04J 3/26
[52] U.S. Cl. .................................. 370/85.4; 370/85.6; 370/94.1; 340/825.5
[58] Field of Search .................... 370/85.1, 85.2, 85.3, 370/85.4, 85.6, 94.1, 94.3, 85.5, 85.12, 85.8; 340/825.5, 825.51

[56] References Cited

U.S. PATENT DOCUMENTS

| | | | |
|---|---|---|---|
| 4,258,433 | 4/1981 | Herschtal et al. | 370/24 |
| 4,326,289 | 4/1982 | Dickinson | 370/85.8 |
| 4,451,827 | 7/1984 | Kahn et al. | 340/825.52 |
| 4,602,365 | 6/1986 | White et al. | 370/85.5 |
| 4,649,535 | 5/1987 | Ulug | 370/85.5 |
| 4,675,671 | 6/1987 | Ishizuka et al. | 370/86 |
| 4,700,185 | 1/1988 | Balph et al. | 340/825.06 |
| 4,701,908 | 4/1988 | Ikeda | 370/85.4 |
| 4,752,924 | 6/1988 | Darnell et al. | 370/86 |
| 4,756,007 | 9/1988 | Qureshi et al. | 375/37 |
| 4,757,497 | 7/1988 | Beierle et al. | 370/85 |
| 4,771,286 | 9/1988 | Niessen et al. | 370/85 |
| 4,782,482 | 11/1988 | Kiatipov et al. | 370/85.15 |
| 4,789,982 | 12/1988 | Coden | 370/85 |
| 4,792,944 | 12/1988 | Takahashi et al. | 370/84 |
| 4,797,879 | 11/1989 | Habbab et al. | 370/3 |
| 4,855,997 | 8/1989 | Wilson et al. | 370/85.1 |
| 4,907,224 | 8/1990 | Scoles et al. | 370/85.2 |

Primary Examiner—Douglas W. Olms
Assistant Examiner—Min Jung
Attorney, Agent, or Firm—John R. Ley

[57] ABSTRACT

Multiple different operational capabilities, such as data transfer rates or communication protocols, are selectable for use on a single LAN. Enchanced nodes of the LAN have the capability of utilizing either an enhanced capability or a common capability in communicating with other nodes. Those basic nodes which are not of the enhanced variety have the capability of communicating utilizing the common capability. The enhanced nodes dynamically select the operational capability for the most efficient communication with other nodes.

66 Claims, 12 Drawing Sheets

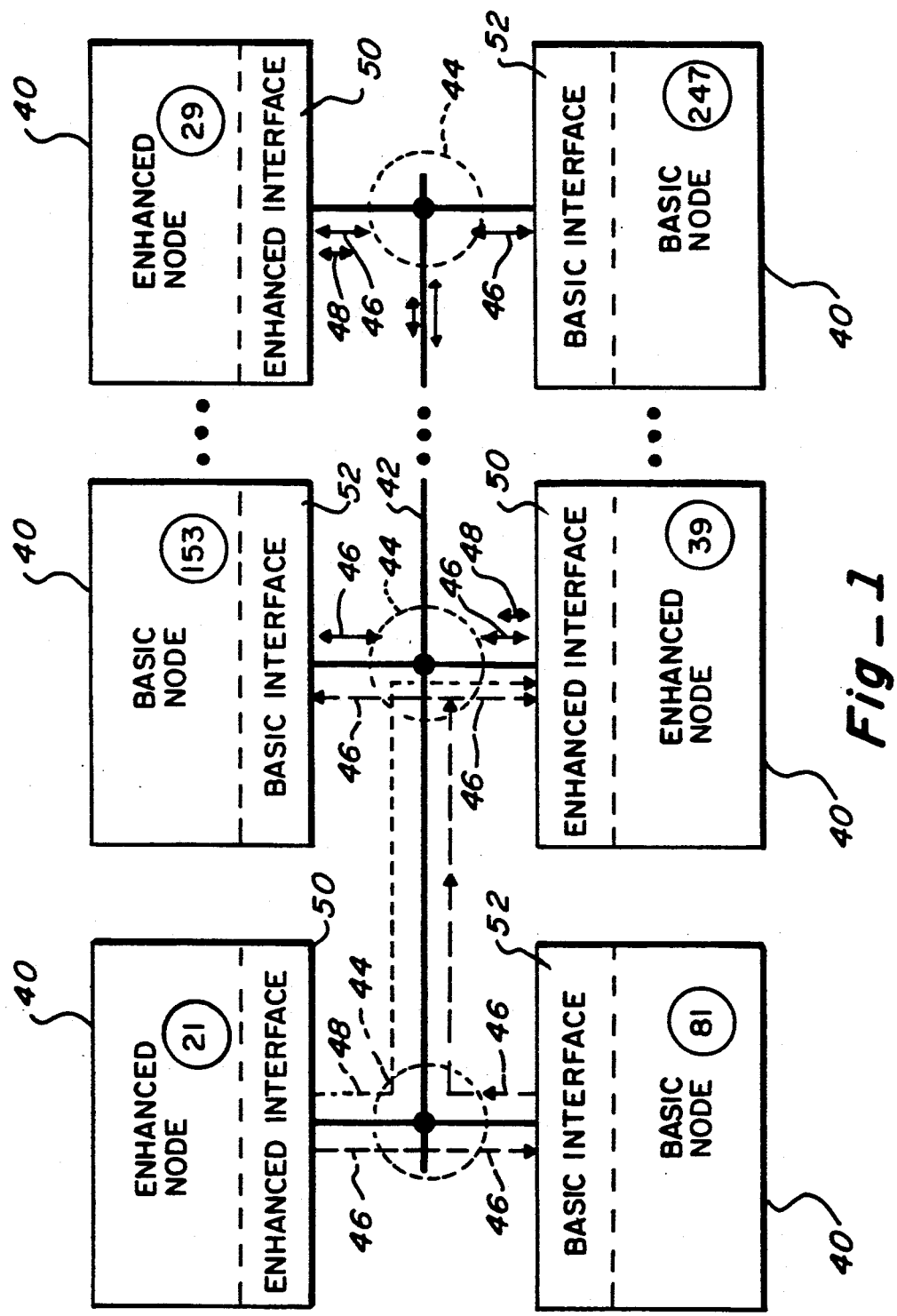
Fig_1

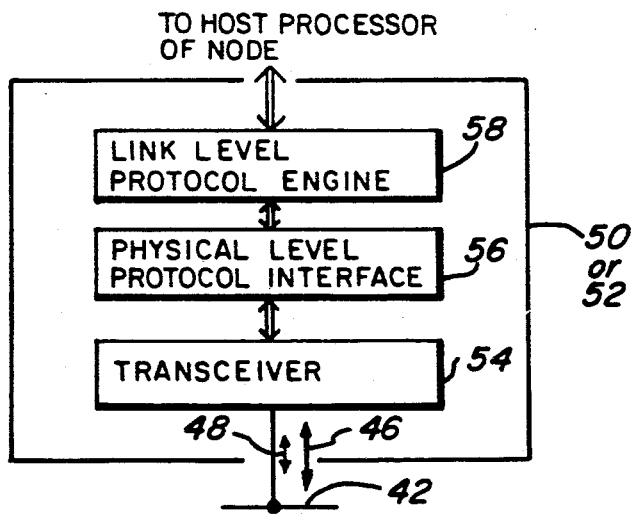
Fig_2
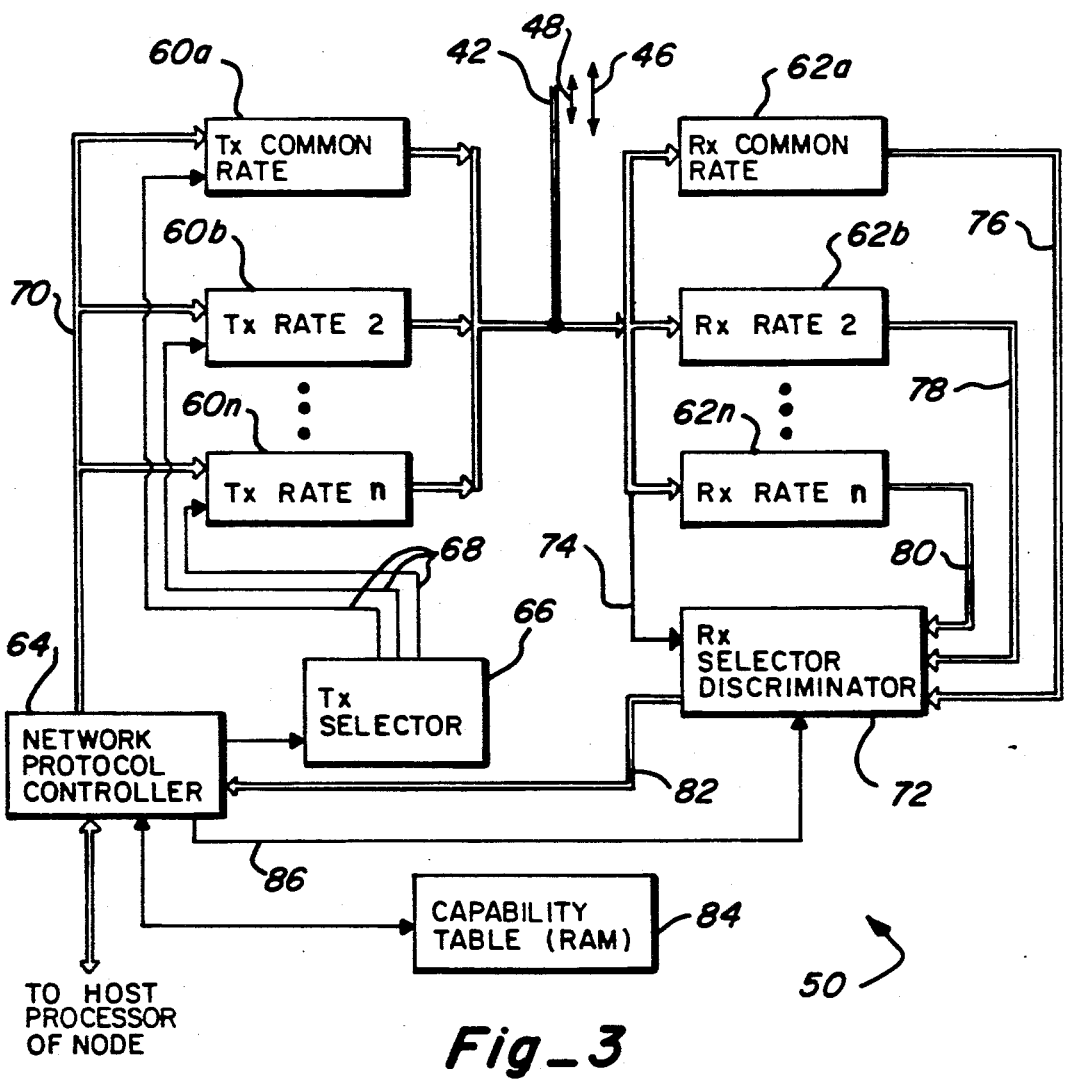
Fig_3

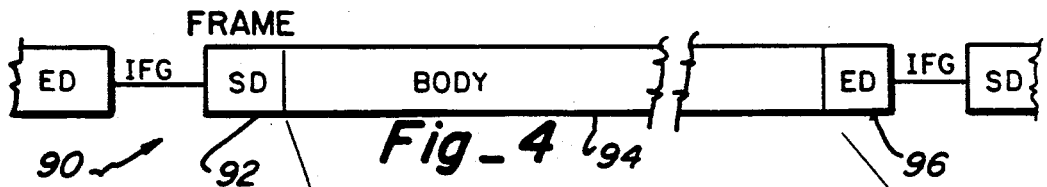
Fig_4
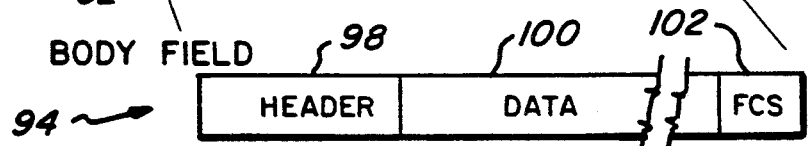
Fig_5
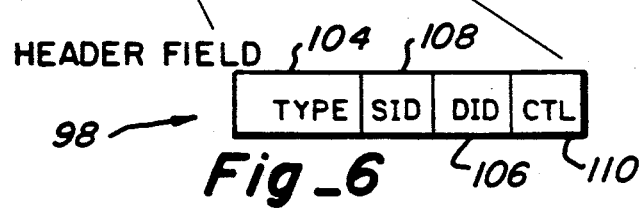
Fig_6
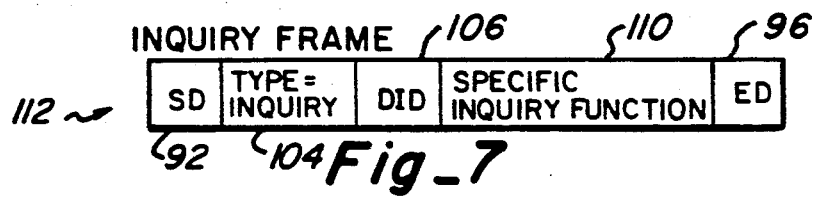
Fig_7
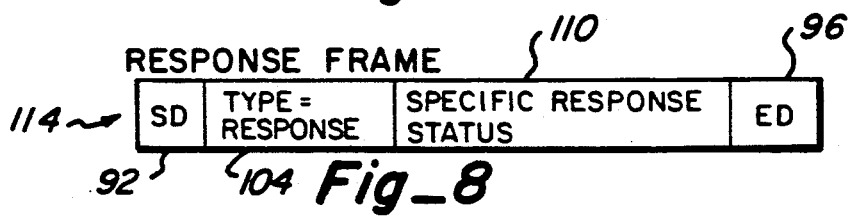
Fig_8
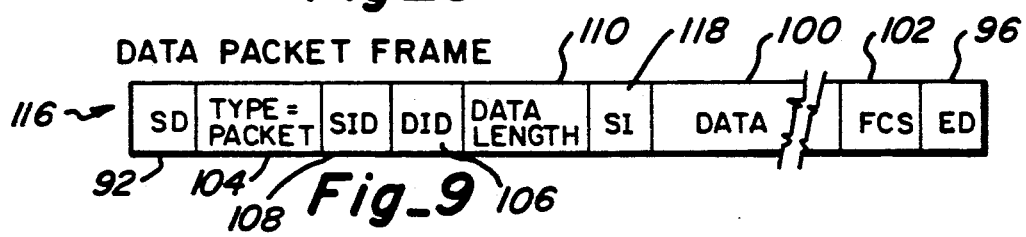
Fig_9
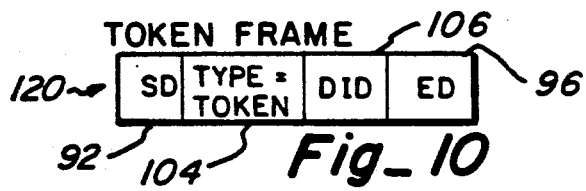
Fig_10
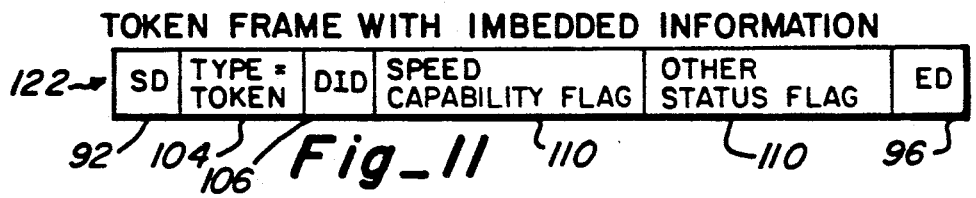
Fig_11

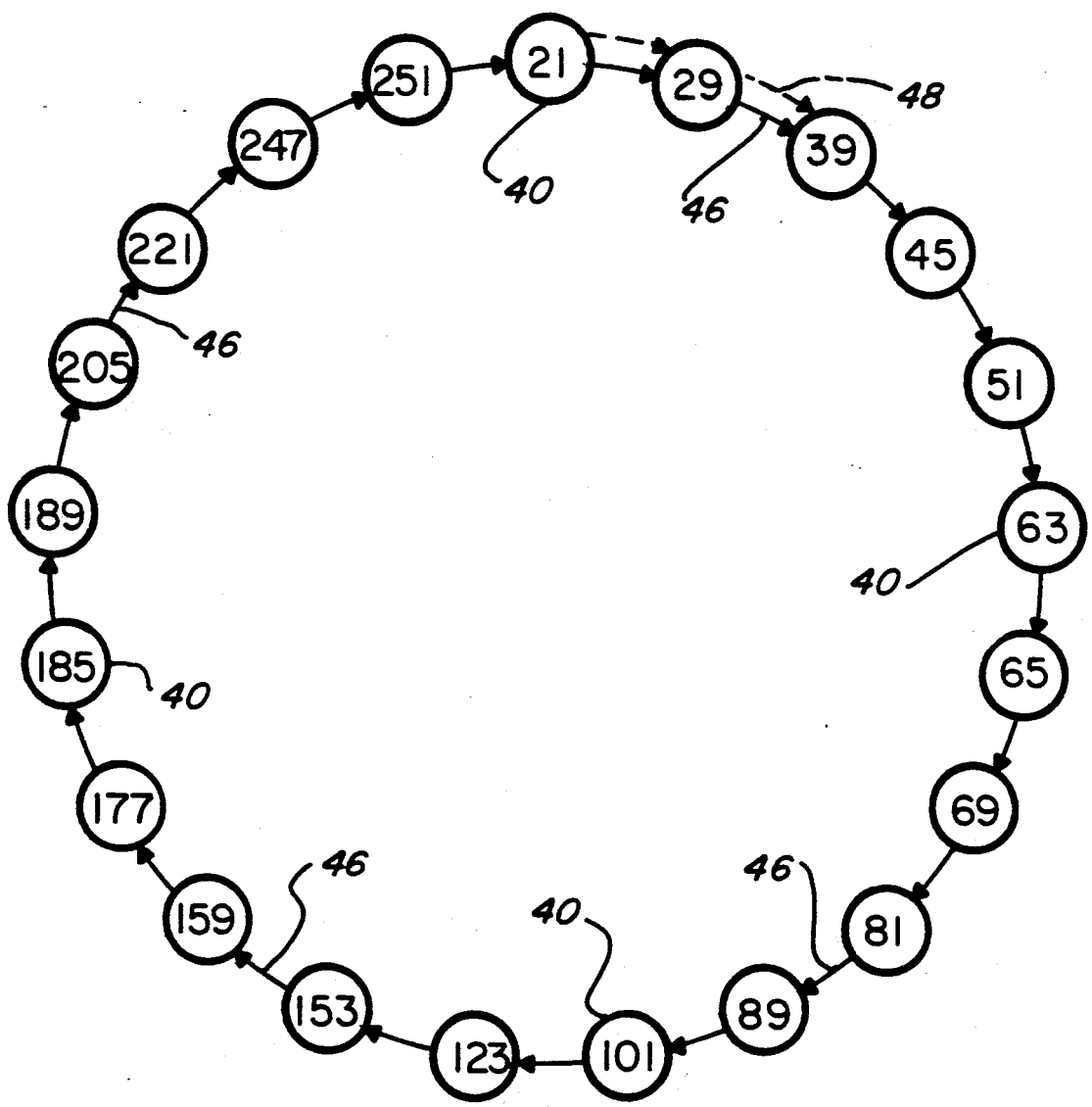
Fig_12

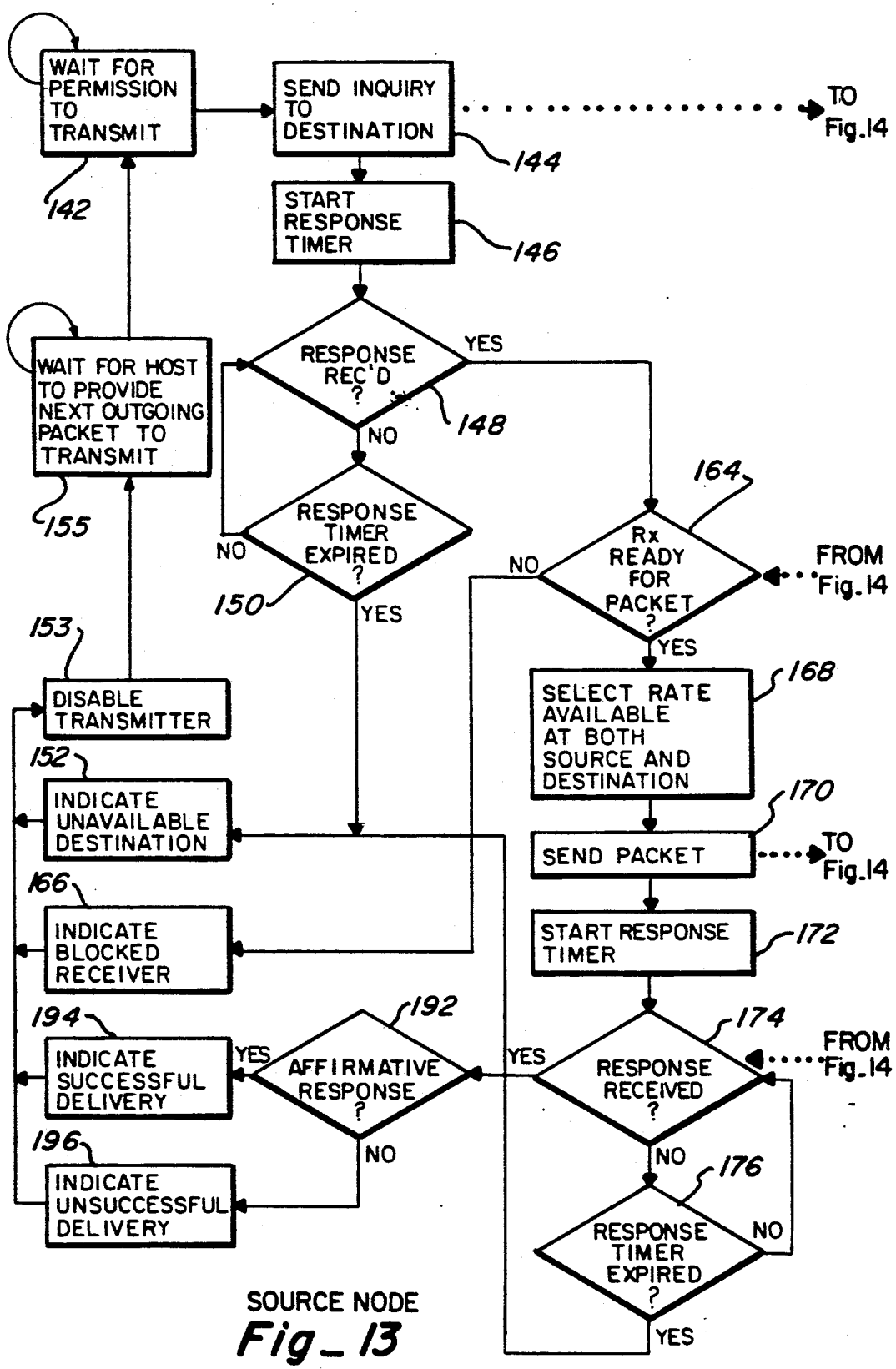
SOURCE NODE
Fig_13

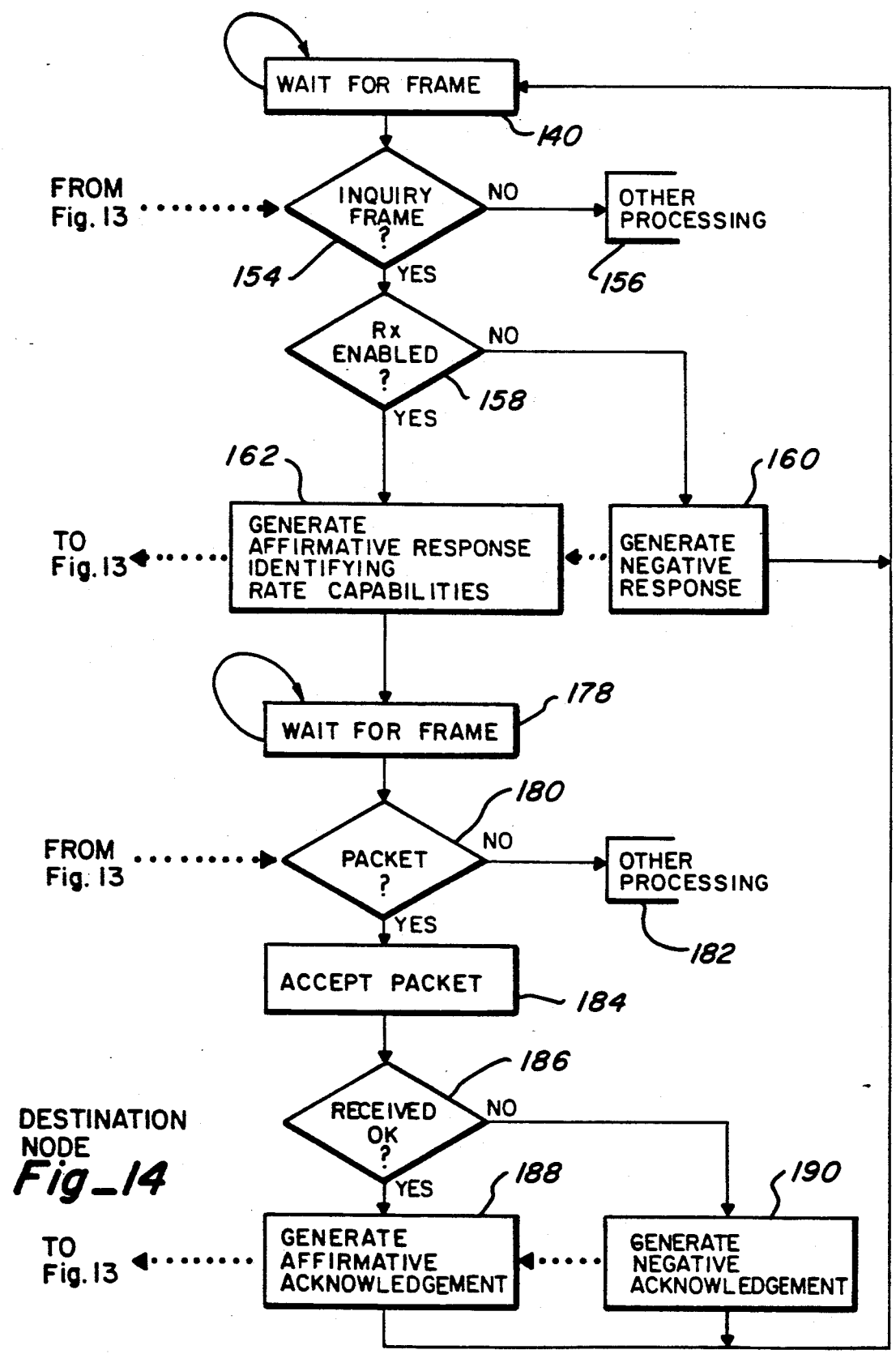
DESTINATION NODE
Fig_14

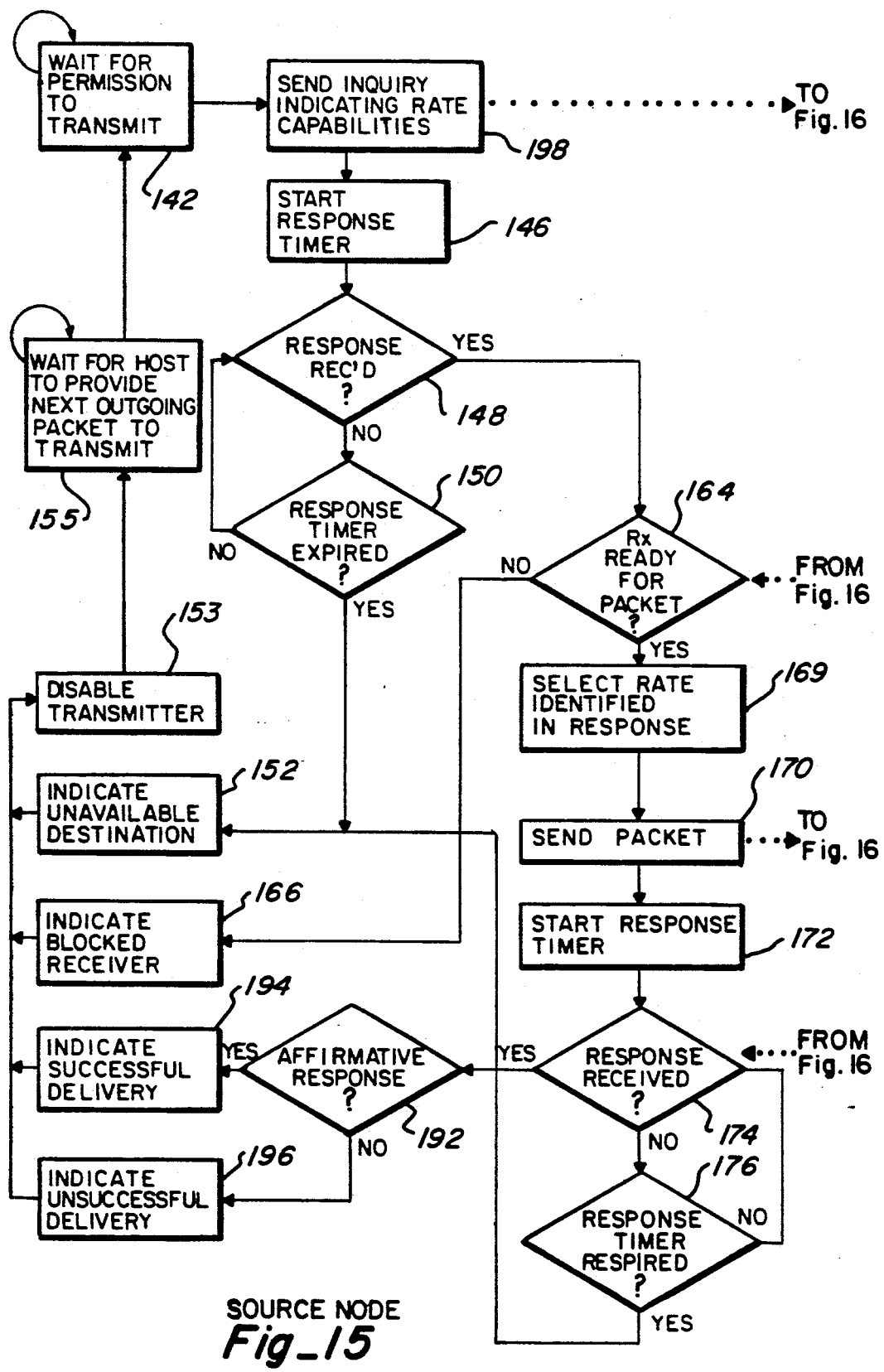
SOURCE NODE
Fig_15

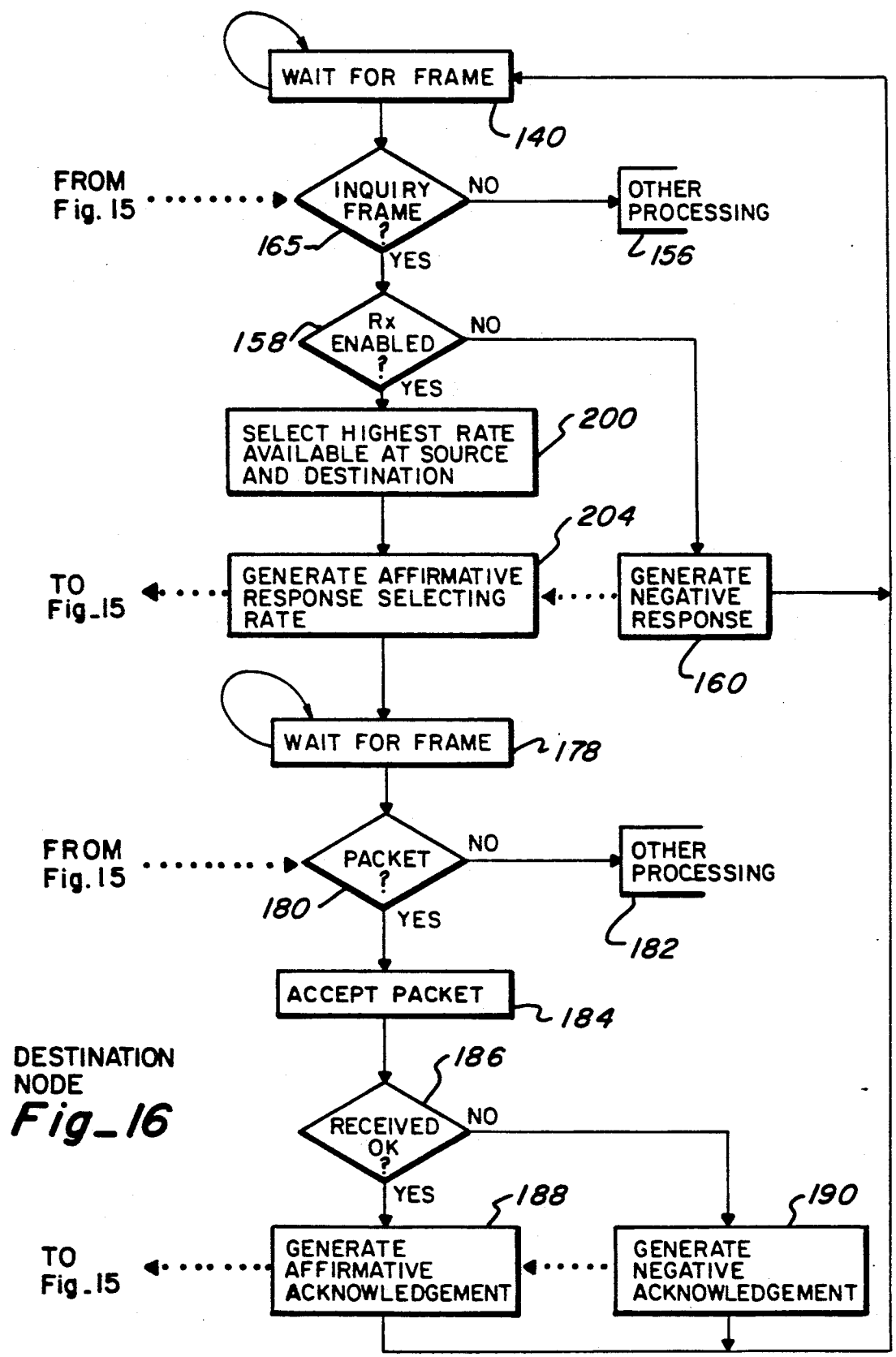

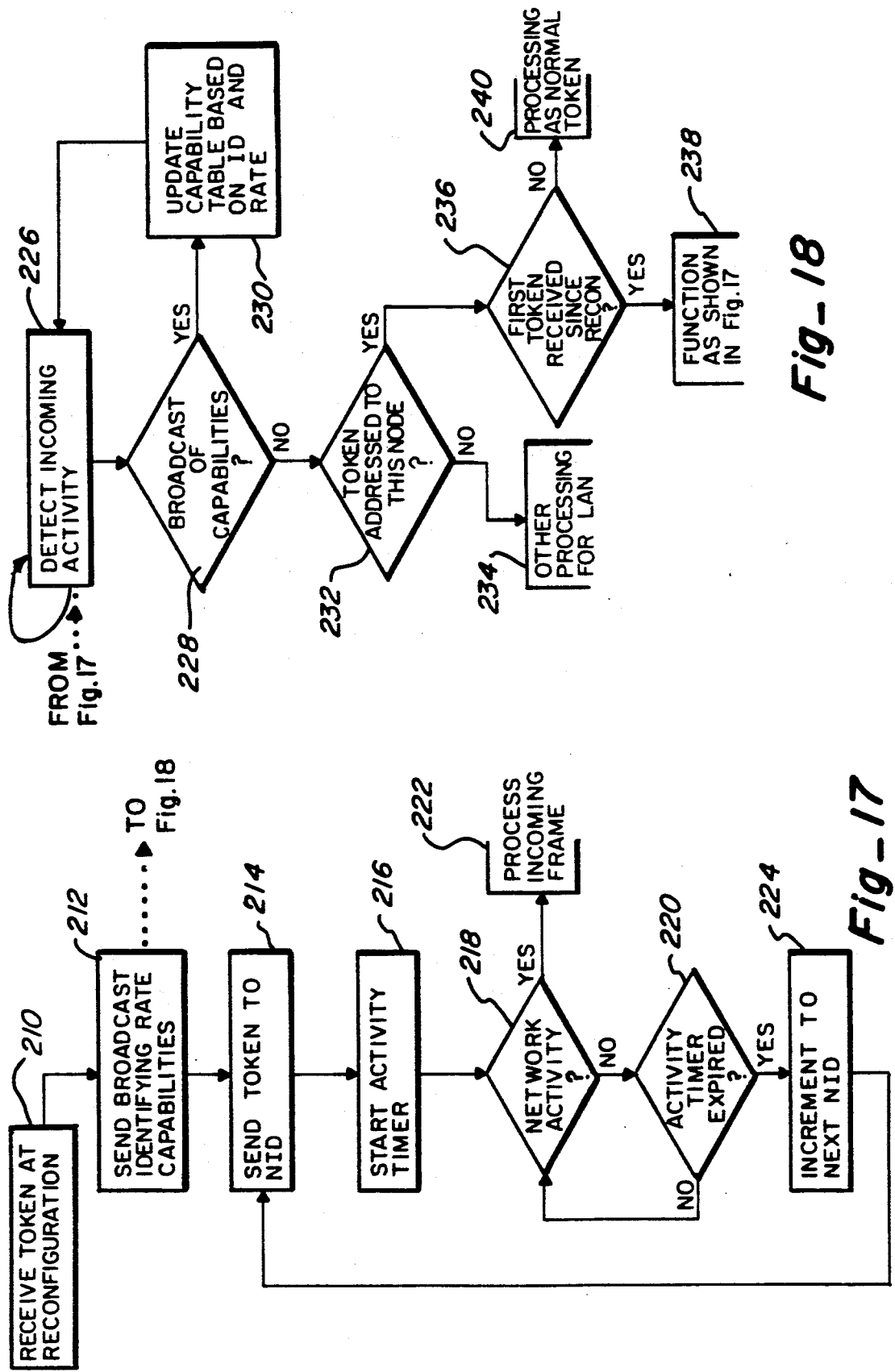

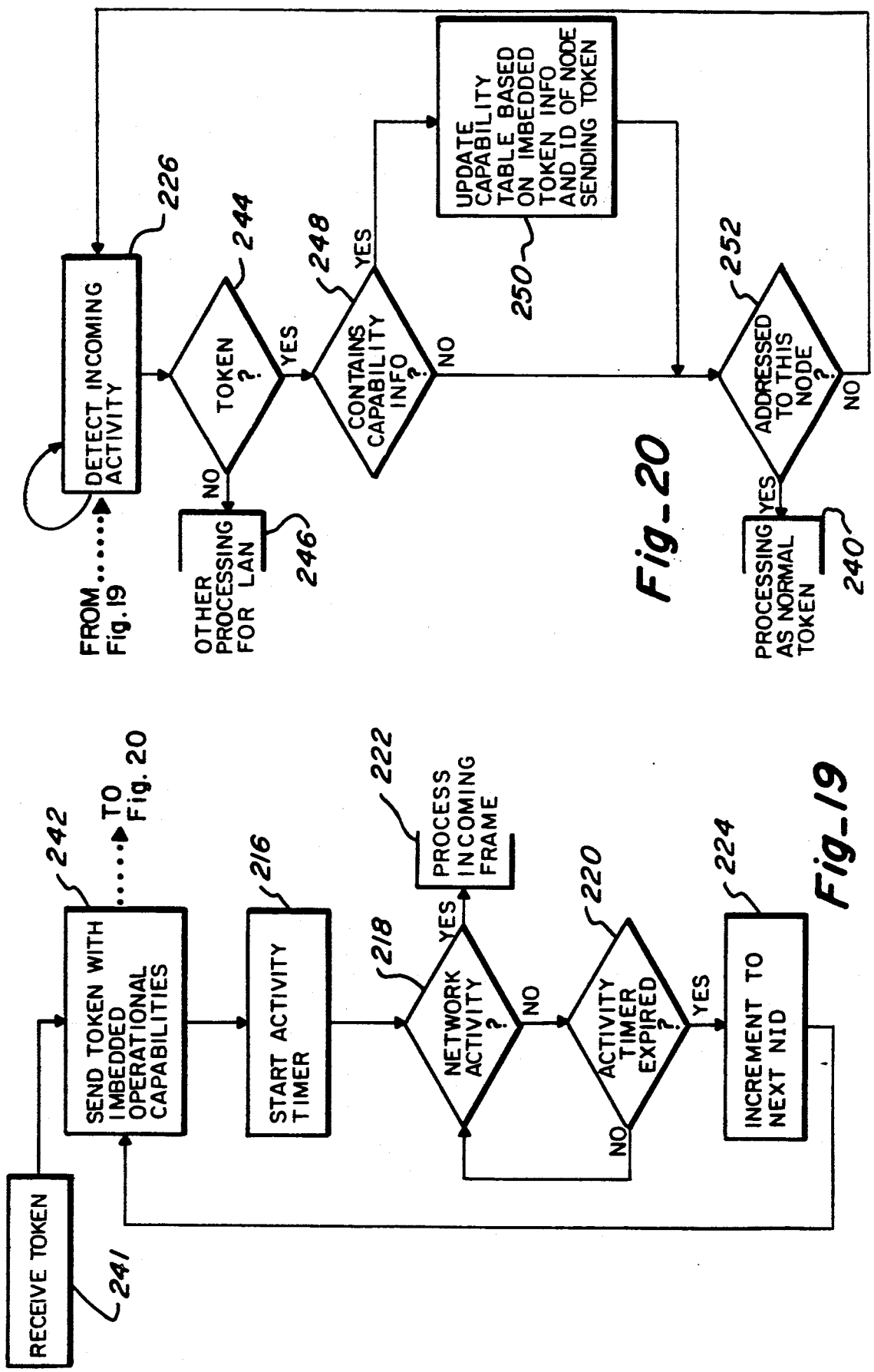

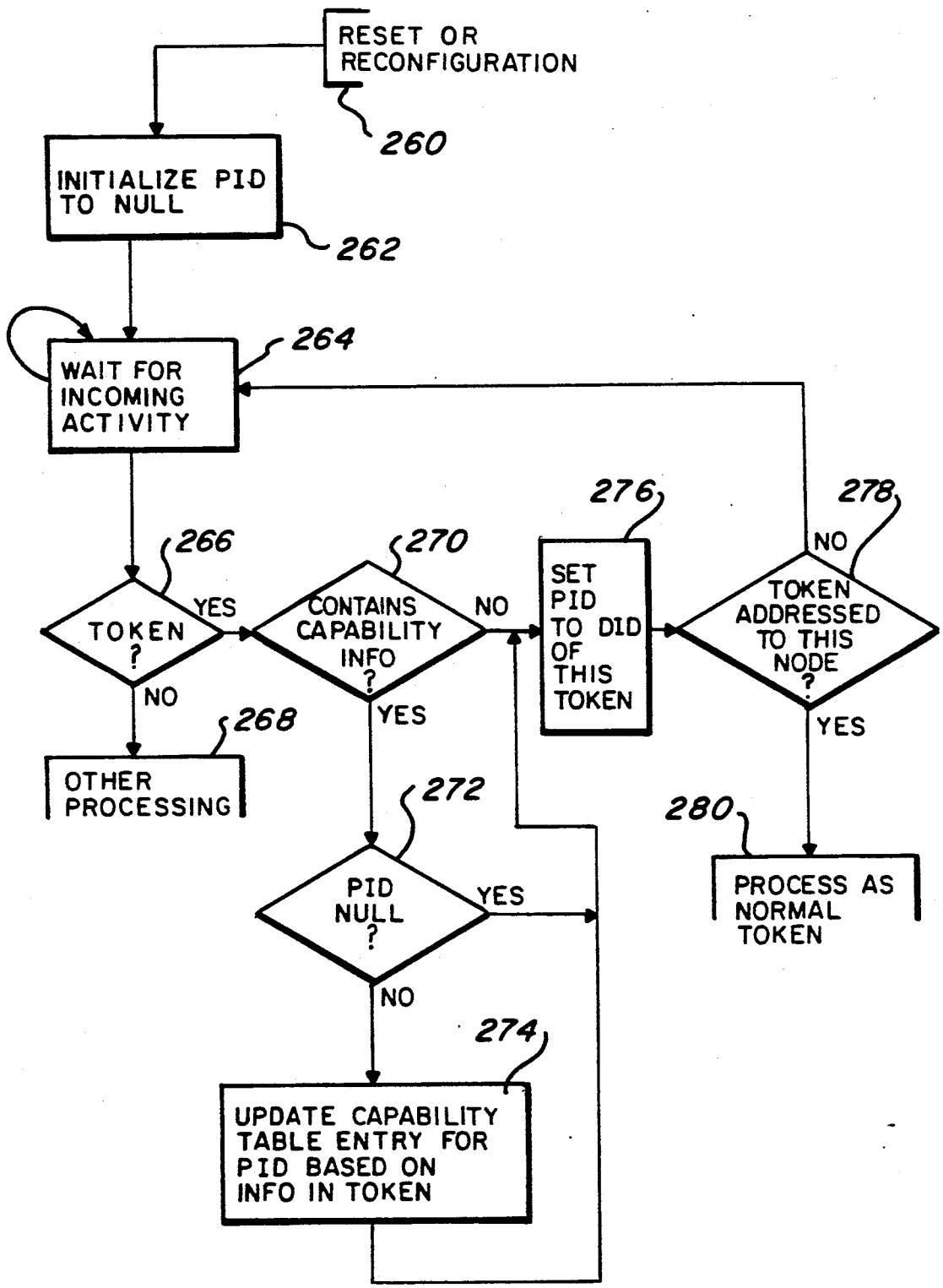
Fig_21

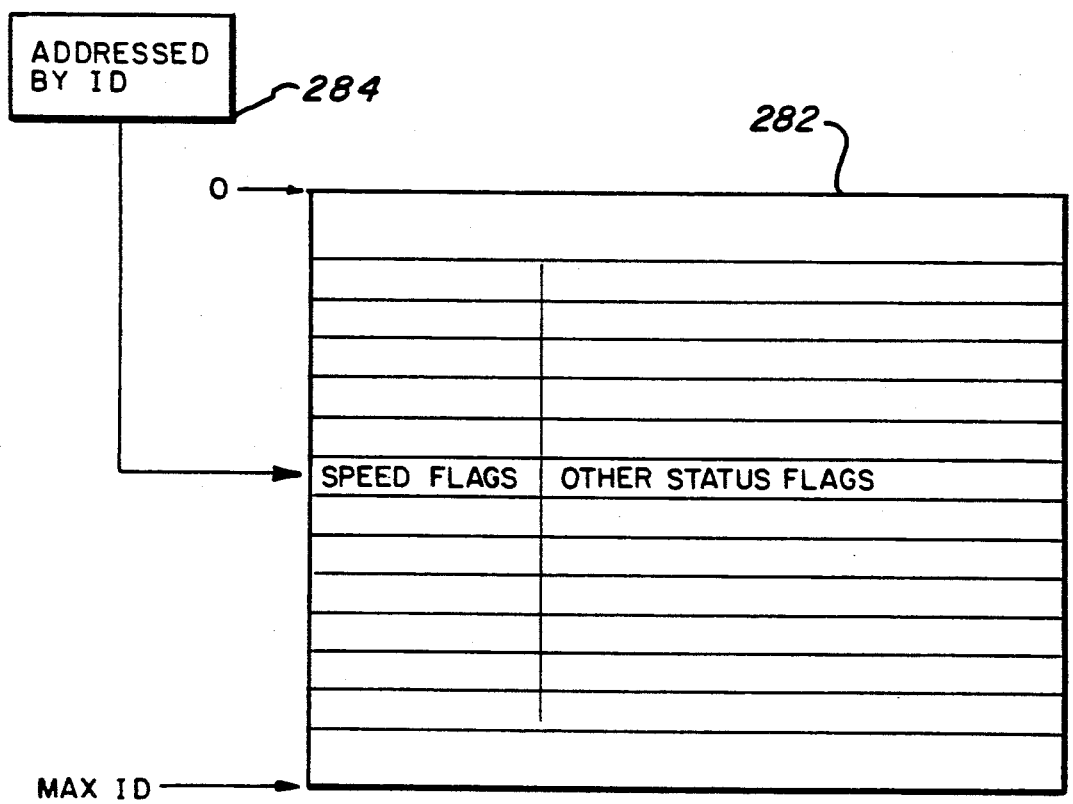
Fig_22
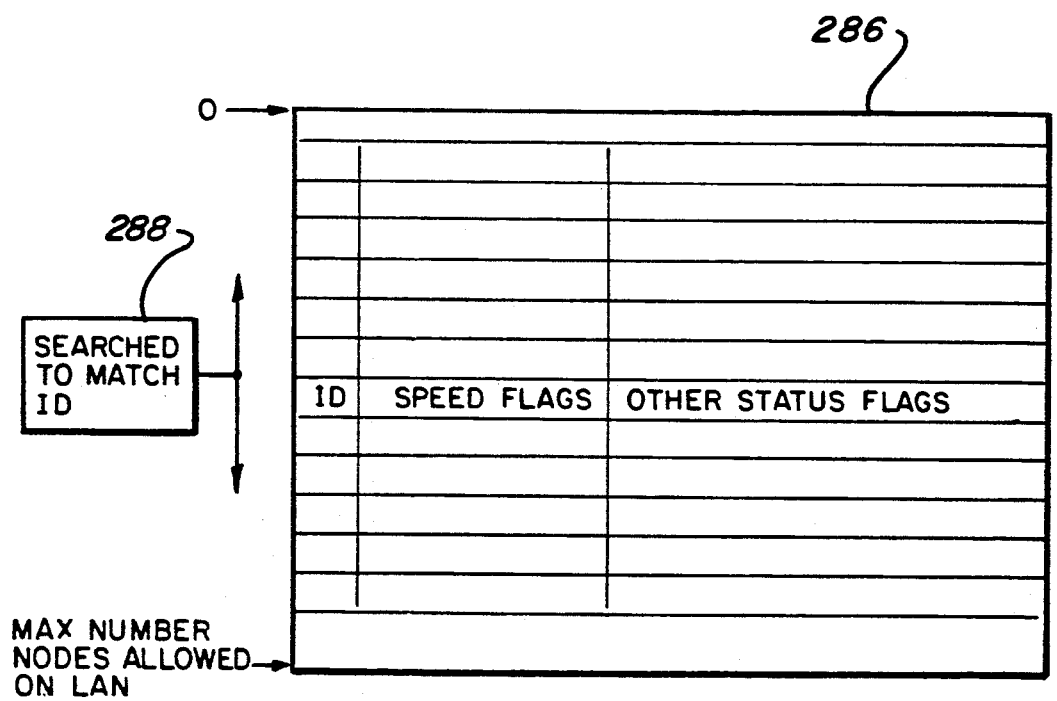
Fig_23

LAN WITH DYNAMICALLY SELECTABLE MULTIPLE OPERATIONAL CAPABILITIES

This is a continuation of application Ser. No. 270,804 filed Nov. 14, 1988, now abandoned.

This invention relates to a local area network (LAN), and more particularly to an improved LAN which provides multiple different operational capabilities, for example data communication rates, for communication between nodes of the LAN.

CROSS-REFERENCE TO RELATED APPLICATIONS

The disclosures of two additional United States patent applications, filed concurrently herewith and assigned to the assignee hereof, relate to this application: LAN WITH INTEROPERATIVE MULTIPLE OPERATIONAL CAPABILITIES, Ser. No. 270,641, and MULTIBIT AMPLITUDE AND PHASE MODULATION TRANSCEIVER FOR LAN, Ser. No. 270,739. The disclosures of these concurrently filed applications are incorporated herein by this reference.

BACKGROUND OF THE INVENTION

Recently LANs have taken on added significance in the field of computer systems. Current advancements point to the desirability of interconnecting computers on an organization-wide basis to obtain more overall distributed computing capacity. LANs are the means by which computers are typically interconnected on an effective basis for this purpose.

As the computing capacities of computers have continued to increase, the data transfer capacities of LANs have remained more or less the same for the past few years. This is because each LAN has its own predetermined operational protocol, and that protocol tends to be the limiting factor on the maximum amount of data which can be transferred. Since adhering to this operational protocol is critical to the proper operation of a LAN, and because the protocol tends to be fixed as an unalterable part of the design implementation of a LAN, improvements in LAN capacity have centered more around efficiency in the software which delivers data to and receives data from the LAN, but not in the operating capacity of the LAN itself. Such software improvements have generally not resulted in substantially enhanced LAN capacities.

LANs of different operational capacities are available. However, LANs of high capacities have tended to require special equipment, are significantly expensive, and have usually been implemented for special purposes rather than common use. The less expensive, more commonplace LANs have tended to have only moderate or low data transfer capacities. While the more commonplace LANs are satisfactory for some purposes, they can easily become a significant overall limitation in networking computers together to achieve system-wide, increased computing capacity.

In many network situations the use of a high capacity, more expensive, special purpose LAN cannot be justified from an overall standpoint. While high capacity devices such as graphics work stations, computational accelerators and file servers can utilize the higher LAN capacity, the number of high capacity devices on the network may be small compared to the number of relatively low capacity devices. The low capacity devices will generally have no need to utilize the higher capacity of a special purpose LAN. Significant expense will be encountered to establish a high capacity network for all of the devices, particularly when a pre-existing network must be replaced. However, failure to do so can result in a significant limitation in overall system-wide capacity because the operational throughput of the relatively small number of high capacity devices is limited by the capacity of the LAN.

SUMMARY OF THE INVENTION

In accordance with its basic feature, the present invention incorporates in a single LAN, multiple different operational capabilities, such as data rates. These multiple different operational capabilities are available at enhanced nodes on the LAN. A node includes not only the device which is connected to the LAN, but an interface means which receives the signals from the device and applies them to the LAN, and vice versa. A common operational capability is preferably available at all of the nodes throughout the LAN, permitting communication between arbitrarily selected pairs of nodes. An additional enhanced operational capability is available at the enhanced nodes. Enhanced nodes are established for those high performance devices which require the higher operating capacity to efficiently communicate with other high performance devices. The common operational capability is provided for nodes with lower performance devices which are suitably serviced by moderate or lower capacity. Thus, the enhanced nodes need only be used for those small-in-number, but significant-in-functionality, high performance devices, while the basic nodes can be economically employed for those larger numbers of lower performance devices. Overall system capacity will thereby be enhanced in those segments of the LAN where enhanced performance is desired. Additional resources need not be committed to those segments of the LAN where moderate or lower capacity is acceptable.

Each enhanced node includes means for selecting either the common or enhanced capability for communicating with every other node. Typically the enhanced capability will be selected by communication between enhanced nodes. The common capability will be selected for communication to the basic nodes. The basic nodes will always communicate at the common capability. Means for determining the enhanced capability is established by capability information inserted in certain frames communicated between nodes. Either an enhanced source node or an enhanced destination node may select the enhanced capability for the communication. More than one type of enhanced capability may be provided at the enhanced nodes, thereby providing a multiplicity of choices of enhanced capabilities. One type of enhanced capability is a higher-than-common data communication rate. Another type of enhanced capability is a different communication protocol.

The present invention can be better understood by reference to the following detailed description taken in conjunction with the accompanying drawings which are briefly described below. Of course, the actual scope of the invention is defined by the appended claims.

BRIEF DESCRIPTION OF THE DRAWINGS

FIG. 1 is an illustration of a bus-type LAN in which the present invention is incorporated, having multiple nodes, including enhanced nodes and basic nodes, connected by a network communication medium.

FIG. 2 is a generalized block diagram of an interface of a standard or enhanced node of the LAN shown in FIG. 1.

FIG. 3 is a block diagram of an enhanced interface of an enhanced node which has the capabilities of operating at a plurality of different rates when communicating with other nodes of the LAN shown in FIG. 1.

FIG. 4 is a general illustration of a frame which is communicated between the interfaces shown in FIGS. 2 and 3.

FIG. 5 is an expanded illustration of a body field of the frame shown in FIG. 4.

FIG. 6 is an expanded illustration of a header field of the frame shown in FIG. 5.

FIG. 7 is an illustration of a typical type of frame known as an inquiry which is communicated between the interfaces of the LAN shown in FIG. 1.

FIG. 8 is an illustration of a typical type of frame known as a response which is communicated between the interfaces of the LAN shown in FIG. 1.

FIG. 9 is an illustration of a typical type of frame known as a data packet which is communicated between the interfaces of the LAN shown in FIG. 1.

FIG. 10 is an illustration of a typical type of frame known as a token which is communicated between the interfaces of the LAN shown in FIG. 1.

FIG. 11 is an illustration of a new type of frame known as a token with imbedded information which communicates the rate, status and other capabilities of one enhanced interface to another enhanced interface of the LAN shown in FIG. 1.

FIG. 12 is an illustration of a logical loop of the sequence in which a token is passed among the nodes of a token-passing LAN, such as is represented in FIG. 1.

FIGS. 13 and 14 are complementary flow charts illustrating the logical operations of two enhanced interfaces, each of which is shown in FIG. 3, and also illustrating one embodiment of the present invention where a source node selects the rate at which the source node transmits data and a destination node receives the data. FIG. 13 illustrates the logical operations of the enhanced interface at the source node, and FIG. 14 illustrates the logical operations of the enhanced interface at the destination node, in this circumstance.

FIGS. 15 and 16 are complementary flow charts illustrating the logical operations of two enhanced interfaces, each of which is shown in FIG. 3, and also illustrating another embodiment of the present invention where a destination node selects the rate at which a source node transmits data and the destination node receives the data. FIG. 15 illustrates the logical operations of the enhanced interface at the source node, and FIG. 16 illustrates the logical operations of the enhanced interface at the destination node, in this circumstance.

FIGS. 17 and 18 are complementary flow charts illustrating the logical operations of two enhanced interfaces, each of which is shown in FIG. 3, in a token-passing bus-type LAN, and also illustrating another embodiment of the present invention where a broadcast frame is transmitted from a node in receipt of the token during reconfiguration to all other nodes on the network to communicate the capability information of the node which is making the broadcast. FIG. 17 illustrates the logical operations of the enhanced interface at the source node, and FIG. 18 illustrates the logical operations of the enhanced interface at the destination node, in this circumstance.

FIGS. 19 and 20 are complementary flow charts illustrating the logical operations of two enhanced interfaces, each of which is shown in FIG. 3, in a token-passing bus-type LAN, and also illustrating another embodiment of the present invention where the token which is passed from node to node on the LAN includes imbedded information which communicates the capability information of the node which passes the token. FIG. 19 illustrates the logical operations of the enhanced interface at the source node, and FIG. 20 illustrates the logical operations of the enhanced interface at the destination node.

FIG. 21 is a flow chart illustrating a logical procedure for determining the identification of nodes which pass the token in accordance with FIGS. 19 and 20, where the token does not contain the identification of the node sending it.

FIGS. 22 and 23 are each illustrations of a memory layout of a capability table of the enhanced interface shown in FIG. 3. FIG. 22 illustrates a technique preferable for use when the number of bits of node identification is relatively small, and FIG. 23 illustrates the technique preferable for use when the number of bits of node identification is relatively large.

DETAILED DESCRIPTION

The present invention applies to a local area network (LAN or "network") having a single network configuration such as that shown in FIG. 1. The LAN comprises a plurality of nodes 40 which are all commonly interconnected to a communication medium 42. The communication medium 42 includes means by which signals are transmitted between the nodes 40. The communication medium may take the form of a plurality of interconnected signal communication links, such as coaxial cables, twisted cable pairs, optical links, radio links, or combinations of these and others. Although only six representative nodes 40 are illustrated in FIG. 1, it is not unusual for a single LAN to have hundreds of nodes 40 connected to a single medium 42.

The LAN illustrated in FIG. 1 is a bus-type LAN, meaning that all of the nodes 40 are connected to a single logical point (the medium 42) and logically in parallel with one another. An essential characteristic of a bus-type LAN is that each transmission by any node is communicated directly to the receivers of all other nodes. Typcially, the nodes are connected through connecting point devices known as hubs 44. A hub 44 is a means by which a plurality of signal communication links can be connected together, thus connecting all the communication links to a single common logical point, the medium 42. Hubs facilitate cable management, signal amplification and/or fault isolation. Hubs neither interpret, nor modify, LAN communications. Each node of a bus-type LAN may directly address and communicate with all of the other nodes as equal peers through the single logical point. Although a bus-type logical connectivity is illustrated and described herein, the invention may be adapted to LANs having other types of predetermined logical connectivity patterns, for example, stars. The nodes are equal peers because none of them have a higher hierarchical status than the others for purposes of communicating in accordance with the predetermined logical connectivity pattern over the single network configuration.

Each node 40 of the LAN has its own unique network address, known as an identification (ID). This address or ID is assigned to the node at the time the node is physically connected to the LAN medium 42. The numbers enclosed within circles in the nodes 40 shown in FIG. 1 are representative examples of network addresses.

The nodes 40 communicate with each other by utilizing the IDs in the "frames" of data which form each transmission. The node which initiates the communication, hereinafter referred to as a "source" node, includes the ID of the node to which the transmission is addressed when it transmits over the medium 42. The node to which the communication is addressed is hereinafter referred to as a "destination" node. Since all of the other nodes on the LAN also receive the signals transmitted by the source node, the address of the destination node (DID), is utilized by each node on the network to recognize and accept only those transmissions addressed to it, while discarding or not recognizing the other transmissions not addressed to it. In addition, since some communications over the network involve multiple transmissions of signals between the source and destination nodes, the source node also frequently includes its own address (SID) in transmissions so the destination node can utilize that address when replying. Broadcasts, which are received by all nodes, and multicasts, which are received by predefined groups of nodes, are also made possible by this addressing technique.

There are two well-known, predominant varieties of bus-type LANs, both of which are illustrated in FIG. 1. One such LAN is a token-passing, bus-type LAN, an example of which is that manufactured and sold by the assignee hereof under its United States registered trademark ARCNET. An extensive amount of information has been published on the ARCNET LAN, both by the assignee of the present invention and by others. Components to implement the ARCNET LAN are commercially available from sources including the assignee and others. One source of information concerning the ARCNET LAN is the *ARCNET Designer's Handbook* published by Datapoint Corporation, San Antonio, Tex., copyright 1983. The other well known variety of bus-type LAN is a carrier sense multiple access (CSMA) LAN. An example of a CSMA LAN is that marketed under the trademark ETHERNET. An extensive amount of material has been published on the ETHERNET LAN, by a variety of different sources. Components to implement the ETHERNET LAN are commercially available from a number of sources. The present invention applies to LANs such as that illustrated in FIG. 1, including the token-passing and CSMA varieties.

Two different types of nodes 40 are present on the LAN in accordance with the present invention. As is shown in FIG. 1, basic nodes at IDs 81, 153 and 247 and enhanced nodes at IDs 21, 29 and 39, are both connected in the LAN. The basic nodes have only a single common operational capability, and therefore always operate in accordance with this common operational capability. The enhanced nodes have multiple different operational capabilities. One of the multiple operational capabilities available from each enhanced node is the common operational capability also present in each basic node. Thus, both the enhanced and the basic nodes share one common operational capability which may be used for communication. At least one of the multiple operational capabilities of each enhanced node is an enhanced operational capability which is substantially different than the common operational capability. Furthermore, in accordance with the present invention, the enhanced nodes of the LAN are capable of dynamically selecting among themselves which of the operational capabilities to employ in communicating with another enhanced node and with a basic node. The common operational capabilities of each basic node remain unaffected by the presence of the enhanced nodes, thus preserving the normal operational capacity of the LAN and avoiding the necessity to replace the whole LAN to obtain enhanced communication capabilities between a limited number of high performance nodes, i.e. the enhanced nodes.

The common and enhanced operational capabilities of the basic and enhanced nodes of the LAN are illustrated by the dash lines 46 and 48 shown in FIG. 1. The longer dash lines 46 represent the common operational capability. The enhanced node ID 21 may communicate at the common operational capability with the basic node ID 81. Similarly, the basic node ID 81 can communicate only at the common operational capability with another basic node ID 153 and with an enhanced node ID 39. The shorter dash lines 48 illustrate an enhanced operational capability which is used only by the enhanced nodes. The enhanced node ID 21 may communicate only with the other enhanced nodes, e.g. ID 39, at the enhanced capability. Of course, the network medium 42 should carry the signals representative of either type of operational capability with equal facility. As is represented by the longer dash lines 46 and the shorter dash lines 48, the enhanced nodes can communicate at both operational capabilities, while the basic nodes can communicate only with the common operational capability.

Operational capability as used herein may refer to a variety of substantially different operational functionalities. As is used primarily herein by way of example, and because it is the preferred form of the multiple different operational capabilities contemplated by the present invention, the communication or data transfer rates between the nodes is an example of a different operational capability. As an example but not to be used to construe the extent of the difference in operational capabilities, the common data transfer rate capability over the LAN may be at 2.5 million bits per second, while the enhanced data rate transfer capability may be 20 million bits per second. Another example of an enhanced operational capability is that the LAN may employ a different communication protocol of an enhanced capacity compared to the common communication protocol. These examples of different operational capabilities are described in greater detail in the co-pending application for a "LAN WITH INTEROPERATIVE MULTIPLE OPERATIONAL CAPABILITIES".

Each node includes means providing an interface 50 or 52 by which signals are applied to and received from the medium 42. Enhanced nodes include enhanced interfaces 50, while the basic nodes include basic interfaces 52. Each mode, whether enhanced or basic, also includes a host computer or processor (not shown) which performs various data processing functions or a controller performing data transfer functions. For example, a node may include a personal computer, work station, a network server computer, or a network-connected I/O device interface, sensor or actuator, or the like, which transmits and receives data over the medium 42. The function of the interfaces 50 and 52 is to send the data over the medium, to receive the data from the medium, to receive the data to be sent from the host processor, and apply the data received to the host processor, so that the host processor can function in an efficient and reliable manner. Because each node includes an interface 50 or 52, the functionality of the interfaces is distributed throughout all of the nodes of the LAN.

The basic components of a typical interface 50 or 52 are illustrated in FIG. 2. A conventional transceiver 54 applies the electrical, optical or other physical signals to the medium 42 and receives the signals from the medium 42. A physical level protocol interface 56 receives electrical signals from the transceiver 54 and applies electrical signals to the transceiver 54. The signals transmitted on the medium 42 are in bit serial form. One of the functions of the physical level protocol interface 56 is to convert the bit serial data stream into a parallel bit data stream for use by the other elements of the node, and to convert the parallel bit data stream from the other elements of the node into a bit serial data stream. The term "physical level" used in reference to the interface 56 is the well known physical layer in the seven layer reference model for network communications. The physical level or layer is responsible for interfacing with the medium 42, detecting and generating signals on the medium, and converting and processing the signals received from the medium. In very general terms, the physical layer concerns the general encoding of network data into waveforms which will travel on the medium, and decoding those waveforms when received. The physical level protocol interface 56 and the transceiver 54 achieve these functions.

Each interface 50 or 52 also includes a link level protocol engine 58. "Link level" again refers to the standard seven layer reference model for networks, and generally relates to the sending and receiving of frames of data over the medium 42 and controlling access to the medium 42. Frames of data, as will be discussed below, relate to groupings of various physical level signals in such a way to achieve the desired network functionality. For example, all the functions involved in sending and receiving frames, including inserting starting delimiters, ending delimiters, and stripping these off once the data is received, are link level functions. Other link level functions are control of access to the medium and the handling of affirmative and negative acknowledgements. The link level protocol engine 58 controls and achieves the type of functionality to which this invention primarily relates. The higher levels of communication in the seven layer model are generally handled by the host or I/O processor of the node. Even though it is preferred to implement the functionality of the interfaces in a distributed manner in each node, some of this functionality, for example media access control, can be implemented on a centralized basis, as is known.

More reliable network interfaces generally provide a separate link level protocol engine, generally implemented as a microsequencer operating from firmware. However, many of the link level functions could also be achieved by the host processor. Generally speaking the advantages of providing a separate link level engine 58 are that its functionality is generally independent from the host processor, and therefore offers more reliability and interoperability in LAN functionality. The functionality of the link level protocol engine 58 in the common capability of operation is identical in all nodes, and its functionality is isolated and secure against possible malfunctions in the host software or hardware. A second reason for providing a separate link level protocol engine 58 is that the time dependent aspects of the operation of the host processor are isolated from the time dependent aspects of data communication over the LAN. Use of the separate link level protocol engine 58 avoids sporadic timing problems between the host processor and the signals on the LAN. Lastly, the use of the separate link level protocol engine 58 allows some of the functionality from the host processor to be offloaded, thereby increasing the productivity of the host processor.

The basic interfaces 52, as shown in FIG. 1, are commercially available from a wide variety of sources, depending upon the type of LAN involved. For example, basic interfaces 52 on an ARCNET LAN are known as resource interface modules (RIMs). The link level engine 58 which is used on the ARCNET LAN is commercially available as an integrated circuit designated COM90C26 from Standard Microsystems Corp. and 90C26 from NCR Corporation. The physical level interface 56 used on the ARCNET LAN is commercially available as an integrated circuit designated COM90C32 from Standard Microsystems Corporation and 90C32 from NCR Corporation.

An example of an enhanced interface 50 is shown in FIG. 3. As has been previously noted, the multiple operational capabilities selected for illustration of the present invention are different data communication rates. Accordingly, the enhanced interface 50 includes a plurality of transmitters 60a, 60b, ..., 60n, each of which operates at a different data rate. The transmitters are commonly connected to the network medium 42. A plurality of receivers 62a, 62b, ..., 62n, are also included. These receivers receive signals from the network medium 42. At least one of the transmitters, 60a, and one of the receivers, 62a, operate at the common data rate. Therefore, the enhanced interface 50 will always be able to transmit and receive at the common data rate. The remaining transmitters, 62b, ..., 62n, will generally have other substantially different data rate transmitting capabilities. Similarly, the remaining receivers, 62b, ..., 62n, will also have other substantially different data rate receiving capabilities. While not required, it will generally be the case that all enhanced interfaces 50 will include a complementary set of transmitters and receivers, each of which is operative to transmit and receive at the same data rate. For example, transmitter 60b and receiver 62b will both operate at the same data rate. In some limited circumstances it might be useful that a particular enhanced node would have the capability to transmit or receive data at an enhanced data rate for which it has no corresponding capability to receive or transmit data, respectively.

The various transmitters and receivers illustrated in the enhanced node 50 may actually be separate items, as indicated in FIG. 3, or may be incorporated into a single device. When incorporated into a single device, the device must be capable of both transmitting and receiving at multiple different rates and of doing so without confusing or substantially altering the information conveyed. One example of a transceiver capable of multiple different data rate capabilities is disclosed in the copending, simultaneously filed application for MULTI-BIT AMPLITUDE AND PHASE MODULATION TRANSCEIVER FOR LAN.

Each enhanced node 50 also includes a network protocol controller 64. In a typical case, the network protocol controller 64 will control all of the physical and link level protocol functionality, leaving the network, transport and other higher levels of network functionality to the host processor of the node. The network protocol controller 64 is the preferred means for achieving the physical and link level functionality described herein. The protocol controller 64 controls a transmitter selector 66 which in turn supplies a control signal 68 to a selected one of the transmitters 60a, 60b, ..., 60n, to activate the selected transmitter. Data from the host computer is converted by the protocol controller 64 into the appropriate frame format for both the common and enhanced operational capabilities. The protocol controller assures that all transmissions are in accordance with the established protocols for the selected operational capability. Media access is also controlled by the protocol controller 64.

The enhanced interface 50 also includes a receiver selector-discriminator 72. Signals from the network medium 42 are preferably applied as control signals at 74 to the selector-discriminator 72. In the majority of cases, the signals supplied over the medium 42 will unambiguously identify the rate at which those signals are transmitted. The physical characteristics or signal elements of the signals may distinguish the data rates from one another. The signals form a control signal at 74 which allows the selector-discriminator 72 to select one of the data paths 76, 78 and 80 from the receivers 62a, 62b ... 62n, respectively, which will be coupled through the selector-discriminator 72 over the data path 82 to the network protocol controller 64. Of course, the network protocol controller 64 removes the various link and physical level control information from the signals in the data path 82, and supplies those remaining signals to the host processor of the node. The selector-discriminator 72 discriminates among the various data rates present on the medium 42, and selects the appropriate receiver which supplies the data to the network protocol controller 64.

A capability table 84 is also connected to the protocol controller 64, in the enhanced interface 50. The capability table is a random access memory (RAM) in which information is recorded regarding the rate capabilities and other capabilities (if appropriate) of other nodes on the network. This information is made available to the protocol controller 64 for use in selecting one of the transmitters 60a, 60b ... 60n, for transmission of the data present at the data path 70. The data rate and other information relative to the other nodes is recorded in table 84 in association with the ID of each node, as is discussed more completely below.

In addition to controlling the selection of the transmitter, the data in the capability table 84 may also be used by the protocol controller 64 to supply a control signal at 86 to the receiver selector-discriminator 72 for selecting the appropriate one of the receivers to receive transmissions. The control signal at 86 is used by the selector-discriminator 72 when the characteristics of the raw signals applied at 74 are insufficient to discriminate between multiple different data rates on the medium 42. Under such circumstances, the protocol controller 64 would obtain information, either from the host processor, the capability table 84 or from other sources disclosed below, that transmissions from a particular other node would be arriving at a particular rate. Under those circumstances, the signal at 86 would select the appropriate receiver and/or data path from the receiver to couple over the data path 82 to the protocol controller 64.

The capability table 84 may not be needed in all embodiments of the present invention. In the circumstance described below where the data rate is dynamically selected as a part of a communication initiated between nodes, the capability table 84 would be unneeded, because the rate information would be included as a part of the communication, and the selection would be made immediately before transmitting the data. In an alternative embodiment of the present invention, the data transmission and reception rates may be automatically selected in accordance with the information previously recorded in the capability tables 84 of both the source node and the destination node, thereby avoiding the necessity and overhead for the extra transmissions during the communication to establish the appropriate data rate. A further alternative is to pre-assign capability information to a particular range of node IDs, and to thereafter set the ID of each enhanced node within the pre-assigned range in accordance with the capability of the node.

Based on the information previously recorded in the capability table 84 or otherwise obtained, the source node will generally transmit at the highest data rate that the destination node is capable of receiving. However, it should also be recognized that a destination node and source node could dynamically negotiate or establish a data rate on a communication-by-communication basis which is less than their maximum capabilities if such circumstances are appropriate. Examples of such circumstances might be where open-air optical or radio communication links are included in the medium 42 and atmospheric or other environmental influences have degraded the integrity of the communication link to a point where a high data rate is more likely to result in the unacceptable amount of transmission errors.

The network protocol controller 64 is preferably implemented by a micro-sequencer operating from firmware. Alternatively, the majority of the functions of the network protocol controller 64 could also be implemented on the software of the host computer of the node, but for the reasons previously mentioned, including reliability, compatibility and economical implementation, a separate network protocol controller 64 is preferred. Details of the functions preerably provided by the network protocol controller 64 are discussed below.

Communication between nodes occurs by sending and receiving frames. A frame is a series of signals applied to the medium. An example of a frame which is transmitted and received by the enhanced and basic interfaces 50 and 52 (FIG. 1), respectively, is illustrated in FIG. 4. The frame, referenced 90, starts with a starting delimiter (SD) field 92, includes a body field 94, and ends with an ending delimiter (ED) field 96. A field is a set of sequential symbols included within a frame. Since each frame is in reality a serial stream of signals on the LAN medium, each frame is separated by an interframe gap (IFG) of silence or absence of signals on the medium. The duration of the interframe gap is usually established by fundamental physics and relates to the propagation delays created in part by the physical size of the network. The purpose of the interframe gap is to allow the LAN medium to quiesce after signals have been applied to it and to allow transceiver circuitry to be made ready for the next frame. For most LANs, the interframe gap is at least equal to the physical settling time of the medium. The SD 92 is typically a fixed pattern of signals used to indicate that the frame is beginning and to provide the necessary synchronization or calibration information for the receiver at the destination node. The SD is a physical level protocol element. The body 94 can be variable in length. The ED 96 is a pattern of signals which is fixed in length and in content and serves to mark the end of the frame 90. The ED is also a physical level protocol element.

The body field 94 can be further broken down as shown in FIG. 5. The body field 94 starts with a header field 98, progresses to a data field 100, and ends with a frame check sequence (FCS) field 102. The FCS field 102 will contain an error checking code or, in certain cases, an error correcting code. The data field 100 may contain data, or may be eliminated from some frames. Similarly, the FCS field 102 may also be eliminated in some types of frames. The header field 98 and its contents and the FCS field 102 are normally link level protocol elements.

The header field 98 is illustrated in greater detail in FIG. 6. The header field 98 is generally always present in frames and contains the information needed to identify the type of frame, as is represented by a type field 104, the ID of a destination node (DID) 106, the ID of the source node (SID) 108, and a field 110 which contains control information. The type field 1104 is always preset in a header 98. The DID field 106 and the SID field 108 may or may not be present depending both on the type of network and the type of frame. For example, in most token based networks, the SID 108 is not present in the token frame, and only the DID 106 is present. The order of the SID and DID is reversed in some LAN protocols. The control field 110 is normally both network and frame type dependent. For instance, in the case of a data packet frame, the control field 110 may be used to designate the length of the data field 100 (FIG. 5) which follows the control field 110. The control field 110 may conttain command information in an inquiry frame or status information in a response frame.

A typical inquiry frame 112 is illustrated in FIG. 7. The inquiry frame 112 begins with an SD 92 followed by a type field 104 indicating that this frame 112 is an inquiry. A DID field 101 follows. Typically, in a token based LAN, an SID field is not included because of the fact that the source node is that node in receipt of the token, and the destination node will simply respond by placing aa response on the medium while the source node still holds the token. A specific inquiry function field 110 will typically next follow. IF more than one type of inquiry is possible, the function code in this field 110 will indicate the type of inquiry being made by the frame 112. The inquiry frame 1112 ends with an ED 96.

A typical response frame 114 is illustrated in FIG. 8. A response frame 114 may be generated in response to inquiry frames 112 (FIG. 7) or data packet frames (FIG. 9). The response frame 114 starts with an SD 92, and is followed by a type field 104 which contains a code indicating that this frame 114 is a response. Next, a field 110 is provided for specific response status information, but may be optional in some networks. The response frame 114 ends with an ED 96. A response frame 114 normally does not include an ID field in a token based LAN. This is because it is assumed that a response frame will be generated only pursuant to an inquiry or data packet frame, and that the inquiry or data packet will be transmitted by the node which holds the token. Thus, the first response after the inquiry or data packet is assumed to be addressed to the sender of the inquiry. In effect, the node holding the token "donates" the right to transmit one frame to the destination of the inquiry or data packet frame. Other nodes on the LAN will also receive the response frame 114, but since those nodes do not have an outstanding inquiry or data packet, the response frame 114 will be disregarded at the other nodes.

In some type of response frames 114, the specific response status field 110 is unneeded. The response status may be able to be discerned from the type field 104. For example, in those networks recognizing two types of responses, an affirmative acknowledgement (ACK) and a negative acknowledgement (NAK), the type field itself will generally indicate the type of response.

A typical data packet frame 116 is illustrated in FIG. 9. The data packet 116 commences with an SD 92, followed by a type field 104 which indicates that this frame 116 is a data packet frame. SID 108 and DID 106 fields next follow. In most CSMA networks, a type field 104 is not present because, essentially, all frames transmitted over a CSMA network are data packets. This is because CSMA LANs do not employ tokens, and the forms of inquiry and response are generally imbedded within data packet frames. A data length field 110 is generally included in the data packet frame 116, to indicate the length of a system information (SI) field 118 and the data field 100 which follow. The data packet frame 116 ends with an FCS 102 and an ED 96.

The system information (SI) field 118 is sometimes included in the early portion of what would normally be the data field 100. The SI field 118 contains ancillary or control information relevant at the link and/or network level, while the remaining portion of the data field 100 contains higher level data. The SI field 118 is primarily used to distinguish data packets being used for different higher level protocols. The SI field 118 may also be used to encode control or system information in the same data packet as user data, rather than having to send these items in two separate frames.

A data packet frame 116 generally includes a means for indicating a broadcast to all of the nodes in a LAN. A broadcast is a communication from a single source node to all of the remaining nodes of the LAN, which are destination nodes in the case of a broadcast. A related concept, called a multicast, is available on many LANs. A multicast communicates from a single source node to a predefined group of destination nodes which constitute a subset of the total node population of the LAN. The DID 106 of a broadcast or multicast frame identifies the intended recipient nodes on the nework. Typically, the DID 106 is zero for broadcast data packet frames 116. The DID 106 is coded in a different, but uniquely recognizable manner, for each multicast group of nodes which implement multicast transmission of data packet frames 116. A broadcast of node capabilities to all other nodes on the LAN would require the sending of a data packet frame 116 containing an SI field 118 but no data field 100, or sending a packet whose SI field 118 indicated that the information present in the data area 100 defined the speed or rate capabilities.

A typical token frame 120 is shown in FIG. 10. The token frame 120 starts with an SD 92, followed by a type field 104 which identifies this frame as a token. Next, a DID field 106 contains the ID of the node to which the token is being passed. The token frame 120 ends with an ED 96. Typically, token frames do not contain a source identification because the SID is not needed for the purpose of passing the token.

FIG. 11 illustrates a token frame 122 with imbedded information 122, which is not typical. The token frame 122 with imbedded information includes an SD field 92 and a type field 104. This type field 104 may or may not be different than the type field 104 for a typical token (FIG. 10). A DID field 106 is also included, as are fields 110 containing the capability flags and other status information. The frame ends with an ED 96. Under appropriate circumstances, the SID may be included with the capability fields 110 to aid in associating the capabilities of the node sending the token with the ID of that node. The importance of this capability information is discussed below.

In token passing LANs, it is typical that the functionality for passing the token is distributed to each of the node interfaces 50 and 52 (FIG. 1). In addition to its own ID, the ID of the next active node in the rotational sequence of token passing is also maintained in each node interface 50 and 52. An active node is one which is currently able to participate in network communication but which may or may not have messages to communicate. Inactive nodes, that is those nodes which are not functioning at that time and are therefore not able to participate in network communication, are eliminated from the token passing rotational sequence. Only the active nodes participate in token passing. This avoids wasting time attempting to pass the token to inactive nodes.

Upon receipt of the token, the node initiates a message communication if it has a message to communicate. At the conclusion of the message communication, or if no message communication is to be initiated, the token is passed to the next active node in the rotational sequence. In this manner, the token in passed from active node to active node in an even rotational sequence or token passing loop, as is illustrated by FIG. 12. FIG. 12 illustrates only the sequence of token passing, and not the physical data routing or interconnection pattern of the network.

The even rotational sequence of token passing is typically from an active node of a lesser network ID to the active node at the next higher network ID. When the token reaches the active node of the highest ID, the token is passed to the active node of the lowest ID to commence the next token loop.

Each node stores the identifier (NID) of the next active node in the token loop. In this manner, each active node knows the next active node in the loop to which the token is to be passed. To establish the NID of the next active node for token passing purposes in all of the active nodes, a procedure called network reconfiguration occurs.

Network reconfiguration starts upon power on of the network whenever a new node becomes active on the network, or whenever any node has not received the token in a predetermined period of time. At the beginning of the network reconfiguration sequence, the interface initializes its NID to its own ID. A time-out procedure at each interface is used to select the interface with the highest assigned ID, and that node commences sending a token. The first token sent is to an ID which is equal to its own assigned ID. This is convenient for implementation at the link level in the network protocol controller, but the first functional token passing attempt is to the NID which is the assigned ID of the node plus one. After sending that token, the interface waits for activity on the medium. Such activity only occurs in the case where another node has received the token and is sending a message or passing the token itself. If no activity is sensed within a predetermind time, the interface incremetns its NID and repeats the process. The process continues until the next active node is addressed by the NID and responds to the token by creating network activity. At that point, the interface which sent the token successfully to the next active node senses the activity and establishes the correct NID for that next active node. The interface of the next active node which has accepted the token repeats the procedure until it too has established its NID and successfully passed the token. Incrementing of the NID is performed modulo the maximum LAN ID value to produce a wraparound from the highest ID value to a zero ID value. All of the interfaces of all of the nodes of the LAN function in a similar manner until the NID of each node is determined, which establishes the complete rotational sequence of the token passing loop of the active nodes.

Network reconfiguration can occur at any time to allow new active nodes to enter the token loop. When an interface is first powered on and when it has not received a token for a predetermined time period, it sends a reconfiguration burst. A reconfiguration burst is a signal which is longer than any other communication or frame so it interferes with any communication which is attempted or in progress. This interference prevents passing of the token, thereby forcing all of the other nodes on the network to commence system reconfiguration.

Another type of reconfiguration can occur to allow previously active but now inactive nodes to drop out of the rotational sequence. This reconfiguration does not involve network-wide reconfiguration. When an active node becomes inactive and drops out of the rotational sequence, the attempted token pass to the newly inactive node will result in no interface receiving the token. The node which unsuccessfully attempted to pass the token to the previously active but now inactive node will sense the lack of activity. After a predetermined time period, shorter than that time period before network reconfiguration occurs, the node which unsuccesfully attempted to pass the token will commence the activity of incrementing its NID and sending tokens until a token is successfully passes, as in a network reconfiguration previously explained. However, once the token is successfully passed the token loop is re-established because all of the other nodes in the loop remain active and retain the NIDs they previously established during network reconfiguration. Thus, when a previouslyy active but now inactive node drops out of the rotational sequence, only the preceding active node will establish a new NID, thereby saving some of the time required to perform a network-wide reconfiguration.

In order for the enhanced nodes of the LAN to take effective advantage fo the enhanced operational capabilities, whether data transfer rate, protocol, or the like, means must be provided for determining the enhanced capabilities of the enhanced nodes. Various embodiments of means for determining the enhanced capabilities of the enhanced nodes so that the enhanced nodes may dynamically select the enhanced capabilities are discussed below and illustrated in the flow charts of FIGS. 13 to 21. These flow charts represent the logical operations and functionality achieved by the network protocol controller 64 (FIG. 3) or its equivlaent, as discussed previously. In discussing the operation represented by the flow charts of FIGS. 13 to 21 and in FIGS. 22 and 23, a convention which will be followed is that the step or functionality described in this text will be numbered and enclosed in parentheses to correspond to the step or functionality identified by the corrresponding reference numeral in the drawings. Another convention applied in FIGS. 13 to 20 is that communications between nodes are illustrated by dots with arrowheads indicating the direction of the transmission of the frame.

One example of means for establishing the data rate or other capability on the basis of communication between the nodes prior to transmitting a data packet is illustrated by the flow diagrams shown in FIGS. 13 and 14. These flow diagrams illustrate the situation where the source node selects the data rate. FIG. 13 illustrates the logical operations at the source node, while FIG. 14 illustrates the complementary logical operations at the destination node. The flow charts of FIGS. 13 and 14 primarily apply to token based networks, but modifications to make the present invention applicable to CSMA or other LANs are either apparent or described below or both.

After network reconfiguration, all nodes of the LAN commence operation in a waiting or idle state, either waiting for a token or waiting to be addressed by a transmission. Transmissions from a node commence in a logical sequence which starts in the waiting or idle state. This is shown in FIG. 14 where the destination node is waiting (140) for a frame to be received. Also the source node is waiting until it receives permission to transmit (142), as shown in FIG. 13. In the case of a token based LAN, permission to transmit means that there is a pending packet to be sent and the source node receives the token. In the case of a CSMA LAN, permission to transmit (142) means there is a pending packet to be sent and no activity is sensed on the network medium for an appropriate time, such as the interframe gap time at the end of the previous frame, or expiration of a back-off timer after a collision.

The source node (FIG. 13) sends an inquiry frame to the destination node (144). The inquiry is sent at the common rate to assure that the destination node will be able to receive it. A response timer starts (146) and a wait loop is entered (148, 150) while waiting for a response to be received from the destination node. If a response timer expires (150) before a response is received, the source node will report its status back to the host computer indicating that the destination is unavailable (152) because the destination did not respond. The transmitter of this source node is thereafter disabled (153) for this particular attempted communication, and the operations return to the original state (142) waiting for permission to transmit. Of course, at this time the source node may take other actions unrelated to this attempted communication, such as passing the token, and/or receiving incoming frames addressed to it by other nodes.

In most cases, the destination node (FIG. 14) will generate a response to the initial inquiry (sent at 144). The response will be sent at the common rate. The incoming frame is received and checked (154). If the frame is not an inquiry, other processing appropriate to the particular type of LAN occurs (156). If the received frame is an inquiry, a determination is made (158) whether the receiver is enabled, meaning that there is enough memory or buffer space available to receive a packet and the receiver is functioning. If the receiver is not enabled, a negative response (NAK) is generated (160), and the logical operations return to the waiting state (140). If the receiver is enabled, an affirmative response (ACK) is generated (162). The affirmative response includes information identifying the rate capability at which the destination node is capable of receiving transmissions. This rate capability information is inserted in the status field 110 of the response frame 114 (FIG. 8).

The source node (FIG. 13) receives the response, and tests (164) the response to determine if the receiver is ready to receive the data packet. If a negative response is detected, an indication (166) is supplied of a blocked receiver at the destination node. The transmitter of the source node will thereafter be disabled (153) for this particular attempted communication. On some LANs, the indication (166) may be a logical end of the transmit sequence. Those types of LANs will not attempt automatically to make the data packet transmission at a later time. However, other types of LANs will continue to attempt the transmission of the data packet by reinitiating this sequence each time the source node receives the permission to transmit (142), until stopped by software on the host processor.

If an affirmative response is detected (164), the capability information in the response frame will be extracted and the data rate will be selected (168) for transmission of the data packet from the source node to the destination node. The selection is made by comparing the rate capabilities of the transmitters at this source node with the rate capabilities at the destination node, as described by the extracted capability information from the response frame. As previously discussed, the highest data rate for communication of the packet will usually be selected. The data packet is then sent (170) at this selected data rate. The source node then starts (172) a response timer and enters a waiting loop (174, 176) waiting for a response from the destination node.

Meanwhile, the destination node (FIG. 14) is waiting for a frame (178). When the frame is received at the selected rate, it is tested (180) to determined if it is a data packet. If not, other processing appropriate to the type of LAN commences (182). If a data packet addressed to this node is detected, the packet is accepted (184), rather than being disregarded or ignored as is determined by the DID in the frame. The packet is checked (186) to determine whether it has been received in an acceptable condition, as is determined by the FCS field of the packet. If the packet is acceptable, an affirmative response or acknowledgement is generated (188). If the packet is not acceptable due to data errors, etc., a negative response or acknowledgement is generated (190). Upon generating either of the acknowledgements (188, 190), a loop back to the original state waiting for a frame (140) occurs.

The source node (FIG. 13) is in the waiting loop (174, 176) waiting for the response. If the destination node fails to deliver the response within the time-out period (176), an indication is generated (152) of an unavailable destination, which disables the transmitter (153) and causes the source node to return to its initial condition, waiting for a packet to transmit (155). If the response is received within the established (172, 176) time period, the response is tested (192) to determine whether it is an affirmative response, in which case an indication of successful delivery is generated (194). If a negative response is determined (192), an indication of unsuccessful delivery is generated (196). An indication in either case (194 or 196) disables (153) the transmitter and causes the source node to return to its initial condition waiting for a packet to transmit (155).

Implicit in the operation of the destination node (FIG. 14) is the previously described ability of the receivers in the enhanced interface to discriminate and select the speed which the source node has selected for transmission of the data packet. In the situation where the data rate cannot be unambiguously determined from the signals over the network medium, or where a more affirmative determination is desired, the embodiment shown in FIGS. 15 and 16 can be employed to select the data rate for the transmission and reception. In the logical operations illustrated by the flow charts in FIGS. 15 and 16, the destination node selects the rate at which the transmitter subsequently transmits the data packet.

Much of the functionality illustrated in FIGS. 15 and 16 is identical to that previously described in conjunction with FIGS. 13 and 14. Accordingly, that identical functionality has been designated by similar reference numerals and a description of that identical functionality is not repeated. The description below is confined primarily to the differences of FIGS. 15 and 16 over FIGS. 13 and 14.

In the situation illustrated in FIGS. 15 and 16, the inquiry is sent (198) at the common rate, but the inquiry contains capability information describing the rate capabilities of the transmitters at the source node. The capability information is inserted in the specific inquiry function field 110 of the frame 112 (FIG. 7). The destination node receives this inquiry (165), extracts the capability information and selects (200) the highest rate available at both the source and destination nodes. The selection (200) is accomplished by comparing the data rates available at the source node, as determined from the capability information contained within the inquiry frame, with the speed capabilities of its own receivers. After the selection is made (200), the selected receiver is enabled (not shown but typically accomplished using control signal 86, FIG. 3) and an affirmative response which includes information which designates the selected data rate is sent (204). The selected rate information is inserted in the specific response status field 110 of the response frame 114 (FIG. 8).

The response is received (164) by the source node (FIG. 15), the data rate information is extracted, and the transmitter capable of transmitting at the selected rate is activated (169). Thereafter, the data packet is sent (170) at the selected data rate. In general, the inquiries and responses will be sent at the common rate to assure reception by the nodes, but it is possible for the destination node to send the response back to the source node at the selected rate, if the receivers of the source node are capable of unambiguously distinguishing the selected data rate from the physical characteristics of the signals themselves.

In addition to the advantage of using the functionality shown in FIGS. 15 and 16 when the receivers of the source and destination nodes are incapable of distinguishing between the various enhanced data rates because of the physical characteristics of the signals, the technique shown in FIGS. 15 and 16 can also be used where it is necessary for the node to preselect a receive channel or receiver (62a, 62b . . . 62n, FIG. 3). Since these receivers of a node are normally enabled only for the common data rate, this procedure is important in readying a particular receiver to receive a transmission. Once having sent a response indicating the rate for transmission to the destination node, the receiver at the destination node enables the selected receiver and waits for the packet. If the packet does not arrive within a predetermined response time, the destination node thereafter disables the selected receiver and re-enables the common rate receiver. Of course, the technique illustrated in FIGS. 15 and 16 can also be used where the data rates can be discerned from the signal characteristics, when the added assurance of pre-established data transfer rates is desired.

In many CSMA LANs, there is no low level provision for sending inquiries, as has been previously noted. Thus, to take advantage of the functionality illustrated in FIGS. 13 to 16, it is necessary to send a data packet which functions as an inquiry and to send a reply data packet which functions as a response. In this manner, the data rates can be determined. Furthermore, because of the arbitrary nature of the timing of communications of a CSMA LAN, it may not be appropriate to provide short deterministic time out periods within which a response must be received. Accordingly, the response loops should be adjusted accordingly for the uncertain response time periods which are inherent in CSMA LANs. Lastly, some of the functionality represented in FIGS. 13 through 16 may be more appropriately handled in software on the host or I/O processor in CSMA LANs.

Another exemplary embodiment of means for determining rate capabilities at the enhanced nodes and for establishing the selected rates for communication is shown in FIGS. 17 and 18. This embodiment is primarily applicable to token based LANs. This embodiment communicates the operational or data rate capabilities during network reconfiguration. Each active node broadcasts its rate capabilities when it receives the token during network reconfiguration. This procedure applies only during total network reconfiguration. This procedure does not apply to the partial reconfiguration which occurs when a previously active node becomes inactive and drops off of the network, because in that case no additional information need be exchanged because all of the previously determined information is still valid. However, when a previously inactive node becomes active and joins the network, hence causing a full network reconfiguration, the capability information of the new node must be communicated to all of the other nodes and the new node must obtain the capability information for all of the other nodes.

Upon receiving the token during network reconfiguration, the enhanced node sends a broadcast data packet to all other nodes. The broadcast data packet has inserted therein the enhanced operational or data rate capabilities. Broadcasts always take place at the common rate to insure that all nodes will be able to receive them. All of the other nodes receive the broadcast, and the enhanced nodes extract the capability information, associate the extracted capability information with the ID of the node making the broadcast, and record the associated ID and capability information in a capability table for later use when communicating between nodes. Since each enhanced node will ultimately receive the token during network reconfiguration, by the time that the even rotational sequence of the token loop has been established, all enhanced nodes on the network will have information regarding the enhanced operational capabilities of every other enhanced node on the LAN. This is shown in FIGS. 17 and 18.

Activity commences when an enhanced node (FIG. 17) receives the token during reconfiguration (210). Upon receipt of the token, the enhanced node sends (212) a broadcast frame at the common rate identifying its capabilities. This broadcast frame is sent before the enhanced node passes the token to the NID (214). After sending the token (214), an activity timer is started (216) and a waiting loop (218, 220) is entered. If network activity is detected (218) before the activity timer expires (220), the incoming frame is processed (222) in a manner appropriate to the type of LAN and type of frame. If the activity timer expires (220) before network activity is detected, the node will increment the NID for the token by one (224) and recommence the sequence by sending the token with the incremented NID (214).

Meanwhile, all other nodes of the LAN (FIG. 18) are waiting (226) to detect incoming activity. Upon detection of the activity, that activity is checked (228) to determine if it is a broadcast frame indicating the capability of an enhanced node. If the incoming frame is such a broadcast of capabilities, the capability table of the enhanced node (84 in FIG. 3) is updated (230) based on the ID of the enhanced node sending the broadcast and the capability information contained in the broadcast frame. After updating the capability table, the other enhanced nodes resume waiting (226) to detect other incoming activity. If incoming activity (226) is not a broadcast of capabilities (228), the incoming activity is checked (232) to determine if it is a token addressed to this node. If a token is not detected, other processing applicable to the LAN occurs (234). If a token is detected, indicators within the network interface are checked (236) to determine whether this is the first token received since reconfiguration. If it is determined that the token received is the first one since reconfiguration, this is an indication that the token is being passed as part of the reconfiguration process to establish the NID in the token passing loop. Accordingly, upon receipt of the first token since reconfiguration, the node (FIG. 18) proceeds to function (238) as is illustrated in FIG. 17. If the token received (232) is not the first token since reconfiguration (236), the node proceeds with normal LAN functionality for received tokens (240).

The embodiment of the invention illustrated in FIGS. 17 and 18 provides the opportunity of allowing the LAN to immediately commence communications at the higher data rate capabilities upon receiving the token during normal network operation. If sending inquiries and receiving responses from the two nodes involved in the communication is not part of the normal network protocol, the embodiment shown in FIGS. 17 and 18 allows enhanced network activity to proceed between enhanced nodes at the enhanced rate without the use of inquiries and responses. Even if inquiries and responses are mandatory in the network protocol they can take place at the enhanced rate between pairs of nodes with similar capabilities. If the next node in the token passing loop is an enhanced node, the token can be passed at the higher data rate, as is shown by the dashed lines 48 in FIG. 12. These features are discussed more completely in the co-pending application LAN WITH INTEROPERATIVE MULTIPLE OPERATIONAL CAPABILITIES.

In a non-token based network it is possible to use broadcasts to disseminate the data rate information, in a manner similar to that described in FIGS. 17 and 18. In a non-token based network, when the nodes first join the network, and perhaps periodically thereafter, the nodes send broadcast frames that contain their capabilities. These periodic broadcasts of capabilities occur at the common rate, and are received by all of the other nodes on the network. The capability information which is recorded in the capability table for each of the nodes is built or updated according to these periodic broadcasts.

Another alternative is for each node to start with a null capability table when that node joins the network. During the normal sequence of communication between the nodes on the network, capability information is inserted in the inquiries or responses, which are sent at the normal rate. All other nodes monitor such responses and inquiries for the purpose of extracting the capability information to gradually build up entries in the capability table for all nodes, or at least a substantial portion of nodes, on the network. The disadvantage to this approach, as compared to the approach for a token-based network, is that there is no assurance that optimal functionality will be achieved, because there can be no assurance that the capability table will contain capability information for all of the active nodes. The token controlled communication approach assures that all nodes on the network will have an opportunity to communicate their capability information to all of the other nodes.

Another embodiment of the invention which obtains the capability table information without having to send separate broadcasts during a reconfiguration is illustrated in FIGS. 19 and 20. The function at an enhanced node which is passing the token as is shown in FIG. 19, and the function of each other enhanced node on the network is shown in FIG. 20. The operations shown in FIG. 19 are very similar to those shown in FIG. 17, and many of the same reference numerals are used to identify identical functions. A discussion of this identical functionality will not be repeated, and can be obtained by reference to FIG. 17.

The token is received (241) by the enhanced node (FIG. 19). The token may be one sent during reconfiguration, or during normal network operation when the token is passed in the token passing loop. The node thereafter sends the token (242) with imbedded operational capability information. A token 122 with embedded operational capability information has previously been discussed in connection with FIG. 11. After sending the token (242), the other activities (216, 218, 220, 222 and 224) follow in the same manner as has been described in conjunction with FIG. 17.

At the node receiving the token (FIG. 20), the incoming activity is detected (226). This incoming activity is tested (224) to determine if it is a token. If not, other processing occurs (246) which is appropriate for the LAN. If the token is determined (248) to contain capability information, the capability table is updated (250). After updating the capability table (250), or if the token does not contain capability information, the token is further tested (252) to determine if it is addressed to this particular enhanced node. If it is, it is processed as a normal token (240); if not, the node returns to a state to detect incoming activity (226).

The embodiment of the invention illustrated in FIGS. 19 and 20 is applicable only when it is possible to imbed (insert) the capability information within the token. If it is impossible to imbed this capability information in the token, one of the other embodiments must be practiced. The advantage to the embodiment shown in FIGS. 19 and 20 is that a separate broadcast indicating the capabilities of the enhanced node is avoided, thereby reducing the amount of time consumed in administrative or overhead activities on the LAN. Furthermore, by including the capability information in each token as it is passed, not only during reconfiguration but during the token passing during normal operation of the LAN, it is possible to dynamically update the capability tables of all of the enhanced nodes in a very rapid and continual manner. When employing the embodiment shown in FIGS. 17 and 18, the capability tables are only updated during network reconfiguration, which will occur less frequently than updates occurring during the token passing loop.

In the embodiment shown in FIGS. 19 and 20, the token must be passed at the common rate, unless it has been established since the last reconfiguration that the destination of a particular token pass is an enhanced node. Attempting to pass the token at other than the common rate would result in some basic node failing to recognize the token passed and, because of a time-out, forcing reconfiguration. On the other hand, once the rate capabilities are established, it is possible to pass the token among enhanced nodes at a rate higher than the common data rate. For this reason it is advantageous to assign IDs to all of the enhanced nodes which are contiguous, thereby allowing the enhanced nodes to pass the token among themselves at the higher rate, with increased efficiency. This is illustrated in FIG. 12, where the enhanced nodes ID 21, 29 and 39 are in a continuous, uninterrupted segment of the normal token passing loop, and the higher rate of token passing from node IDs 21 to 29 and 29 to 39 is illustrated by the dashed lines 48, while the solid lines 46 between all of the nodes represents token passing at the common rate.

As has been previously discussed in conjunction with FIGS. 10 and 11, token frames do not typically include the ID of the node passing the token. Since ID information is critical to identifying the operational capabilities of the enhanced nodes in the capability table, it is important to determine the ID of each node which passes the token, in order to practice the embodiments shown in FIGS. 17 to 20. FIG. 21 illustrates one example of means for determining the ID of the node which is passing the token, when the token itself does not include that information. As used in FIG. 21, each enhanced node has an internal storage location, capable of holding a network address, designated PID. During the normal rotational sequence of token passing, the PID contains the ID of the previous token-holding node, that is the ID of the node which received the last token pass (from the DID field of the last token frame).

Referring to FIG. 21, the operation starts (260) upon reset or reconfiguration. The PID value is initialized to null. As is explained below, at least the first token pass in the second token loop must occur before all valid values are present in the capability table. Initializing (262) the PID to null assures that the appropriate capability information is associated with the appropriate PID, because no PID value will be available until the first token pass in the token loop after reset or reconfiguration occurs. The PID value will be obtained from the DID in that first token. Furthermore the capability information to be associated with the starting PID will not be obtained until the second token pass in this loop occurs.

A waiting loop (264) occurs until incoming activity is detected. The incoming activity is checked (266), and if that activity is other than a token frame, the node proceeds to process (268) the incoming frame as is appropriate. If a token is detected, it is checked (270) to determine if it contains capability information. Next, there is a check (272) to determine if the PID is null. If it is not null, the capability table is updated (274) based on the PID value and capability information in the token. If the PID is null or after the capability table has been updated (274), the PID value is set (276) to the DID of this particular token. At this point (276), the PID thereby represents the address of the node which is holding the token, because the node holding the token is at the DID of the token. Thus, when the node which has just accepted the token transmits the token with its own capability information in it, the PID will represent the ID of the node sending the token. The capability information will be associated with the PID value and the capability table will be updated after that node passes the token. The PID value is thus established from the previous token pass, and the capability information is established from the current token pass. All of this information is used to update (274) the capability table based on two sequential token passes in the loop. Because the capability information will not be associated with the PID of the last node in the token loop until the first token pass in the next loop occurs, it is necessary for the second loop of token passing to commence before the first entry for the starting active node in the capability table is valid. The entire capability table could be initialized to reflect the common rate at reconfiguration or at power on reset. Any non-valid entries in the table under this circumstance result only in sub-optimal communicate rate usage, not in an inability to communicate.

After the PID is set (276) to the DID of the token, the token is processed in the normal manner by checking (278) to determine if the token is addressed to this particular node. If so, it is processed (280) as a normal token. If not, the node commences waiting (264) to detect incoming activity.

In following the procedures shown in FIG. 21, care should be taken, particularly when setting the PID to the DID, to distinguish between reconfiguration activities and normal token passing sequences. In reconfiguration activities, it might be possible that spurious information could be recorded (274) in the capability table for IDs of inactive nodes. This would have little negative impact on actual network operation, because the inactive nodes would not be participating in network activity. When a previously inactive node becomes active and joins the network, network reconfiguration will occur, and the reconfiguration process will replace the invalid information with valid information under one of the techniques illustrated in FIGS. 17 to 20.

An advantageous technique for searching the capability table is illustrated in FIGS. 22 and 23. FIG. 22 illustrates the situation where the IDs of each particular node are relatively small in size in terms of the number of digits required for the identification. A memory array 282 is pre-allocated which has addresses which correspond to the IDs of each of the possible nodes. As the capability information for each node is received, the array 282 is addressed (284) according to the ID of the node involved. Of course, the array 282 records the speed flags and other status information at the memory address which corresponds to the node ID.

FIG. 23 illustrates an approach used when the IDs of the node are relatively large. A memory array 286 is provided having memory locations from zero to the maximum physical number of nodes permitted on the LAN. In each location, the ID of the node, the speed flag, and other status information is recorded. To search the array 286, it is necessary to match the search ID (288) to the ID field and then extract the related data rate and other capability information. Any known searching algorithm could be employed.

The capability table illustrated in FIG. 22 is generally much faster to access and involves simpler and less expensive hardware and firmware or software than will be that required for searching the table illustrated in FIG. 23. As an alternative to using a capability table altogether, when a LAN provides only one enhanced capability in addition to the common capability, all nodes above a predetermined address on the network might be assigned as addresses for enhanced capability nodes. Thus, communications between two enhanced nodes would inherently include the enhanced rate capability as an inherent feature of the IDs of the nodes involved in the transmissions.

The improvements available from the present invention allow the dynamic selection of one of multiple enhanced operational capabilities when it is advantageous to do so. Accordingly, enhanced operational capabilities can be achieved by those nodes with enhanced operational capabilities. Furthermore, a pre-existing network of standard or basic components need not be replaced to provide the enhanced capabilities between newly-added enhanced nodes. Many other advantages and improvements are apparent after recognizing the important aspects of the present invention.

Different embodiments of the present invention and their improvements have been described with a degree of particularity. It should be understood, however, that the previous descriptions have been made by way of preferred example, and that the scope of the present invention is defined by the following claims.

What is claimed is:

1. A local area network or LAN, comprising:
   a plurality of at least three nodes;
   a communication medium interconnecting all of the nodes as equal peers in a single network configuration;
   common means associated with each of the nodes for communicating in accordance with a predetermined logical connectivity pattern between each node and all of the other ones of the nodes and for communicating frames containing data over the communication medium at a common operational capability; and
   enhanced means additionally associated with the common means of each of at least two nodes, each node with which an enhanced means is associated being an enhanced node, each enhanced means communicating in accordance with a predetermined logical connectivity pattern between each enhanced node and all of the other ones of the enhanced nodes and communicating frames containing data over the medium at an enhanced operational capability, the enhanced operational capability achieving a substantially different form of data frame communication over the medium between enhanced nodes than the data frame communication over the medium achieved between nodes at the common operational capability.

2. A LAN as defined in claim 1 further comprising:
   selecting means associated with each enhanced means and operative for selecting either the common capability or the enhanced capability for communicating with each other node.

3. A LAN as defined in claim 2 further comprising:
   determining means associated with each selecting means and operative for determining if each other node is an enhanced node.

4. A LAN as defined in claim 3 wherein:
   said determining means operatively makes the determination based on communications originating from each other node.

5. A LAN as defined in claim 4 wherein:
   the enhanced means of each one enhanced node communicates capability information to the other enhanced means of each other enhanced node upon each one enhanced node becoming active.

6. A LAN as defined in claim 5 wherein the capability information is contained in a broadcast communication to all nodes.

7. A LAN as defined in claim 4 wherein:
   the enhanced means of each one enhanced node communicates capability information to the other enhanced means of each other enhanced node in at least some of the communications originating from each one enhanced node.

8. A LAN as defined in claim 7 further comprising:
   extracting means associated with each other enhanced means and operative for extracting the capability information from at least some of the communications originating from each one enhanced node.

9. A LAN as defined in claim 8 further comprising:
   memory means associated with each enhanced means and operative for recording the capability information of each node.

10. A LAN as defined in claim 8 wherein said some of the communications are data packets.

11. A LAN as defined in claim 10 wherein said LAN is of the carrier sense multiple access variety.

12. A LAN as defined in claim 8 wherein said LAN is of the token passing variety and said some of the communications are tokens.

13. A LAN as defined in claim 12 wherein the tokens which are passed communicate the capability information.

14. A LAN as defined in claim 13 further comprising:
   inserting means associated with each enhanced means and operative for inserting the capability information in the token upon passing the token.

15. A LAN as defined in claim 14 wherein the token does not contain address information of the node passing the token but contains address information of only the node receiving the token, further comprising:
   means for determining the address of one node passing the token from the address information of the token which was passed to the one node, and
   means for associating the address of the one node passing the token with the capability information inserted in the token passed by the one node.

16. A LAN as defined in claim 2 wherein:
   said selecting means operatively selects the enhanced capability for communication between enhanced nodes as a part of establishing communications between the enhanced nodes.

17. A LAN as defined in claim 16 wherein:

said selecting means further selects the common capability for communication between an enhanced node and those nodes which are not enhanced nodes.

18. A LAN as defined in claim 4 wherein communicating between nodes also includes sending a data packet from a source node to a destination node, and said enhanced means associated with each enhanced source node and each enhanced destination node communicate with one another to establish the capability at which the data packet is to be sent, as a part of the communication between enhanced nodes.

19. A LAN as defined in claim 18 wherein the communication between the enhanced source node and the enhanced destination node to establish the capability occurs immediately prior to sending the data packet.

20. A LAN as defined in claim 18 wherein the communication between the enhanced source and destination nodes to establish the enhanced capability occurs at the common capability.

21. A LAN as defined in claim 18 wherein the enhanced means at the source node selects the capability at which the communication is to be sent.

22. A LAN as defined in claim 21 wherein the selection is based at least in part on information communicated by the destination node.

23. A LAN as defined in claim 18 wherein the enhanced means at the destination node selects the capability at which the communication is to be sent.

24. A LAN as defined in claim 23 wherein the selection is based at least in part on information communicated by the source node.

25. A LAN as defined in claim 2 wherein the operational capability is a data rate.

26. A LAN as defined in claim 2 wherein a plurality of enhanced operational capabilities are available at each enhanced means, and each enhanced capability is different from each other enhanced capability.

27. A LAN as defined in claim 2 wherein each enhanced means is a part of each enhanced node, and said selection means is thereby distributed to each enhanced node.

28. A LAN as defined in claim 1 wherein the enhanced means is associated with less than all of the nodes.

29. A LAN as defined in claim 1 wherein all communication occurs between nodes by the transmission and reception of frames.

30. A LAN as defined in claim 1 wherein each node includes an interface means for transmitting and receiving communications from the communication medium, and the common and enhanced means are inherent components of the interface means of each enhanced node.

31. A method of communicating information frames between at least three nodes in a local area network or LAN, comprising:
interconnecting all of the nodes as equal peers in a single network configuration;
communicating frames containing data between all of the nodes at a common communication capability and in accordance with a predetermined logical connectivity pattern;
communicating frames containing data between at least two nodes at an enhanced communication capability and in accordance with a predetermined logical connectivity pattern, the nodes between which frames are communicated at the enhanced capability each being an enhanced node; and
achieving a substantially different form of data frame communication over the medium between enhanced nodes than the data frame communication over the medium achieved between nodes at the common operational capability.

32. A method as defined in claim 31 further comprising:
selecting either the common capability or the enhanced capability for communicating between the nodes.

33. A method as defined in claim 32 further comprising:
determining if the nodes between which a communication is to be directed are enhanced nodes.

34. A method as defined in claim 33 further comprising:
utilizing information contained in frames originating from each node to make the determination.

35. A method as defined in claim 34 further comprising:
communicating capability information to the other enhanced nodes upon each enhanced node becoming active.

36. A method as defined in claim 35 further comprising:
broadcasting the capability information in a broadcast frame to all the nodes.

37. A method as defined in claim 34 further comprising:
communicating capability information to the other enhanced nodes in at least some of the frames originating from each enhanced node.

38. A method as defined in claim 37 further comprising:
extracting the capability information from at least some of the frames originating from each enhanced node.

39. A method as defined in claim 38 further comprising:
recording the capability information of other enhanced nodes in a memory of an enhanced node.

40. A method as defined in claim 38 wherein said some of the communication frames are data packets.

41. A method as defined in claim 40 wherein said LAN is of the carrier sense multiple access variety.

42. A method as defined in claim 38 wherein said LAN is of the token passing variety and said some of the communication frames are tokens.

43. A method as defined in claim 42 further comprising:
passing the tokens to communicate the capability information.

44. A method as defined in claim 43 further comprising:
inserting the capability information in the token upon passing the token from each enhanced mode.

45. A method as defined in claim 44 wherein the token does not contain information of the mode passing the token but contains address information of only the node receiving the token, and further comprising:
determining the address of one node passing the token from the address information of the token which was passed to the one node, and
associating the address of the one node passing the token with the capability information inserted in the token passed by the one node.

46. A method as defined in claim 32 further comprising:
  selecting the enhanced capability for communicating frames between enhanced nodes as a part of establishing communications between the enhanced nodes.

47. A method as defined in claim 46 further comprising:
  selecting the common capability for communicating frames between an enhanced node and those nodes which are not enhanced nodes.

48. A method as defined in claim 32 wherein:
  communicating frames between nodes includes sending a data packet from a source node to a destination node; and further comprising:
  selecting the capability by communicating between each enhanced source node and each enhanced destination node to establish the capability at which the data packet to be sent.

49. A method as defined in claim 48 wherein communicating between the enhanced source node and the enhanced destination node to establish the capability occurs immediately prior to sending the data packet.

50. A method as defined in claim 48 wherein communicating between the enhanced source and destination nodes to establish the enhanced capability occurs at the common capability.

51. A method as defined in claim 48 wherein the enhanced source node selects the capability at which the communication is to be sent.

52. A method as defined in claim 51 further comprising:
  selecting the capability based at least in part on capability information communicated by the destination node.

53. A method as defined in claim 48 wherein the enhanced destination node selects the capability at which the communication is to be sent.

54. A method as defined in claim 53 further comprising:
  selecting the capability based at least in part on capability information communicated by the source node.

55. A method as defined in claim 32 wherein the communication capability is a data rate.

56. A method as defined in claim 32 further comprising:
  making available a plurality of enhanced communication capabilities available at each enhanced node, each enhanced capability differing from each other enhanced capability.

57. A local area network or LAN of the token passing variety, comprising:
  a plurality of at least three nodes;
  a communication medium interconnecting all of the nodes as equal peers in a single network configuration;
  common means associated with each of the nodes for communicating in accordance with a predetermined logical connectivity pattern between each node and all of the other of the nodes at a common operational capability; and
  enhanced means additionally associated with the common means of each of at least two nodes, each node with which an enhanced means is associated being an enhanced node, each enhanced means communicating in accordance with a predetermined logical connectivity pattern between each enhanced node and all of the other ones of the enhanced nodes at an enhanced operational capability which is substantially different than the common operational capability; each enhanced means further comprising:
  inserting means for inserting capability information in a token upon passing the token;
  extracting means for extracting any capability information from the tokens passed from each other node;
  determining means for determining if each other node is an enhanced node based on the capability information inserted in a token passed from said each other node; and
  selecting means operative in response to the determined capability information for selecting either the common capability or the enhanced capability for communicating with each other node.

58. A LAN as defined in claim 57 wherein the token does not contain address information of the node passing the token but contains only address information of the node receiving the token, each enhanced means further comprising:
  means for determining the address of the node passing the token from the address information of the token which was passed to the one node; and
  means for associating the address of the node passing the token with the capability information inserted in the token passed by the node.

59. A local area network or LAN, comprising:
  a plurality of at least three nodes;
  a communication medium interconnecting all of the nodes as equal peers in a single network configuration;
  common means associated with each of the nodes for communicating in accordance with a predetermined logical connectivity pattern between each node and all of the other ones of the nodes at a common operational capability; and
  enhanced means additionally associated with the common means of each of at least two nodes, each node with which an enhanced means is associated being an enhanced node, each enhanced means communicating in accordance with a predetermined logical connectivity pattern between each enhanced node and all of the other ones of the enhanced nodes at an enhanced operational capability which is substantially different than the common operational capability; each enhanced means further comprising:
  selecting means for selecting either the common capability or the enhanced capability for communicating with each other node, and
  determining means associated with each selecting means and operative for determining if each other node is an enhanced node; and wherein:
  communicating between nodes includes sending a data packet from a source node to a destination node,
  said enhanced means associated with each enhanced source node and each enhanced destination node communicate with one another to establish the capability at which the data packet is to be sent as a part of the communication between enhanced nodes, and
  said determining means operatively makes the determination based on communications originating from the other node with which the communication occurs.

60. A LAN as defined in claim 59 wherein the communication between the enhanced source node and the enhanced destination node to establish the capability occurs immediately prior to sending the data packet.

61. A LAN as defined in claim 59 wherein the communication between the enhanced source and destination nodes to establish the enhanced capability occurs at the common capability.

62. A LAN as defined in claim 59 wherein the enhanced means at the source node selects the capability at which the communication is to be sent.

63. A LAN as defined in claim 62 wherein the selection is based at least in part on information communicated by the destination node.

64. A LAN as defined in claim 59 wherein the enhanced means at the destination node selects the capability at which the communication is to be sent.

65. A method of communicating information frames between at least three nodes in a local area network of the token passing varietey, comprising:
   interconnecting all of the nodes as equal peers in a single network configuration;
   communicating frames between all of the nodes at a common communication capability in accordance with a predetermined logical connectivity pattern;
   communicating frames between at least two nodes at an enhanced communication capability which is substantially different than the common communication capability in accordance with the predetermined logical connectivity pattern, the nodes between which frames are communicated at the enhanced capability each being an enhanced node;
   communicating capability information to the other enhanced nodes in at least some of the frames originating from each enhanced node, some of the frames being tokens;
   passing a token to communicate the capability information;
   inserting the capability information in the token upon passing the token from each enhanced node;
   extracting the capability information from at least some of the frames originating from each enhanced node;
   determining if the nodes between which a communication is to be directed are enhanced nodes by utilizing information contained in frames originating from each node to make the determination; and
   selecting either the common capability or the enhanced capability for communicating beteween the nodes based on the determination if the two nodes between which the communication is to be directed are enhanced nodes.

66. A method as defined in claim 65 wherein the token does not contain address information of the node passing the token but contains address information of only the node receiving the token, and further comprising:
   determining the address of one node passing the token from the address information of the token which was passed to the one node, and
   associating the address of the one node passing the token with the capability information inserted in the token passed by the one node.

* * * * *

(12) REEXAMINATION CERTIFICATE (4412th)
United States Patent
Fischer et al.

(10) Number: US 5,077,732 C1
(45) Certificate Issued: Aug. 14, 2001

(54) LAN WITH DYNAMICALLY SELECTABLE MULTIPLE OPERATIONAL CAPABILITIES

(75) Inventors: Michael A. Fischer; William M. Cox, both of San Antonio, TX (US)

(73) Assignee: Datapoint Corporation, San Antonio, TX (US)

Reexamination Request:
No. 90/005,269, Feb. 23, 1999

Reexamination Certificate for:
Patent No.: 5,077,732
Issued: Dec. 31, 1991
Appl. No.: 07/559,391
Filed: Jul. 24, 1990

Related U.S. Application Data

(63) Continuation of application No. 07/270,804, filed on Nov. 14, 1988, now abandoned.

(51) Int. Cl.[7] .................................. H04J 3/02; H04J 3/26
(52) U.S. Cl. ...................... 370/437; 370/465; 370/445; 370/451; 340/825.5
(58) Field of Search ..................................... 370/389, 390, 370/391, 396, 400, 401, 402, 410, 445, 449, 450, 466

(56) References Cited

FOREIGN PATENT DOCUMENTS

| 109964 | 6/1984 | (EP) . |
| 121188 | 10/1984 | (EP) . |

OTHER PUBLICATIONS

Michael Teener, "Reducing the Tower of Babel: The P1394 High Speed Serial Bus," Systems Architect, Networks and Communications National Semiconductor Corporation (Jan. 1987).

Bill Hawe, "Transparent Interconnection of Local Area Networks with Bridges," 3J. of Telecomm. Networks (1984).

George T. Koshy, "Understanding Multiple LANs: The Why and How of Linking Up," Data Communications (May 1986).

Andrew W. Tanenbaum, Computer Networks (2d ed. 1988).

Floyd E. Ross, "FDDI an Overview," IEEE Processing of Compcon (Spring 1987).

Information Processing Systems—Open Systems Interconnection—Transport Protocol Specification: ISO/TC97/SC16/WG6 12 Computer Communication Review 24, 33–34 (1982).

Draft Revised CCITT Recommendation X.25, 10 Computer Communication Review 56, 109, 113 (1980).

Transmission Control Protocol: DARPA Internet Program Protocol Specification Transmission Control Protocol: DARPA Internet Program Protocol Specification §§ 3.1, 3.4, (Sep. 1981) ("Transmission Control Protocol") §§ 3.1, 3.4, (Sep. 1981) ("Transmission Control Protocol").

V.22 modem standard ("V.226bis") no date avail.

*Primary Examiner*—Min Jung

(57) ABSTRACT

Multiple different operational capabilities, such as data transfer rates or communication protocols, are selectable for use on a single LAN. Enchanced nodes of the LAN have the capability of utilizing either an enhanced capability or a common capability in communicating with other nodes. Those basis nodes which are not of the enhanced variety have the capability of communicating utilizing the common capability. The enhanced nodes dynamically select the operational capability for the most efficient communication with other nodes.

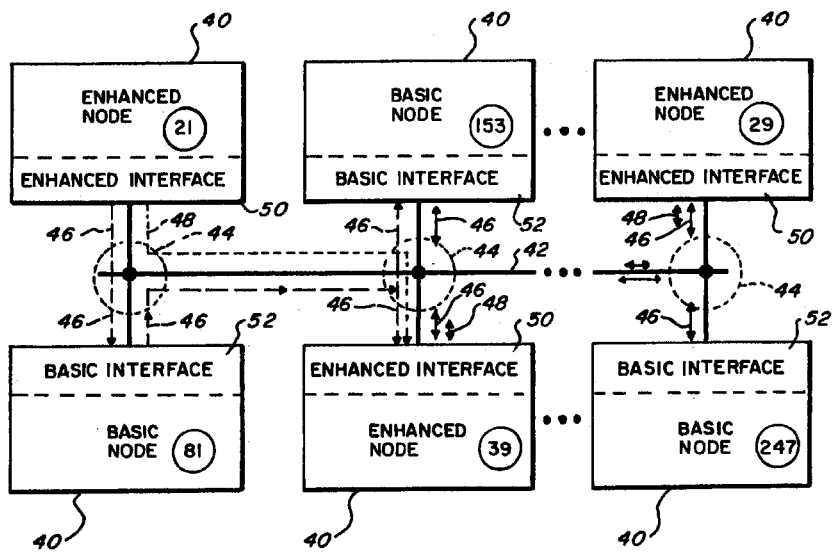

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–66 is confirmed.

* * * * *